(12) United States Patent  (10) Patent No.: US 8,096,392 B2
Edwards et al.  (45) Date of Patent: Jan. 17, 2012

(54) LIGHT WEIGHT BICYCLE BRAKE ASSEMBLY

(76) Inventors: Craig Hawley Edwards, La Canada, CA (US); Bruce Philip Edwards, Menlo Park, CA (US)

( * ) Notice: Subject to any disclaimer, the term of this patent is extended or adjusted under 35 U.S.C. 154(b) by 728 days.

(21) Appl. No.: 12/239,213

(22) Filed: Sep. 26, 2008

(65) Prior Publication Data

US 2009/0078512 A1  Mar. 26, 2009

Related U.S. Application Data

(60) Provisional application No. 60/975,163, filed on Sep. 26, 2007.

(51) Int. Cl.
*B62L 1/14* (2006.01)

(52) U.S. Cl. .................................. 188/24.12; 188/24.21
(58) Field of Classification Search ............... 188/24.11, 188/24.12, 24.13, 24.21
See application file for complete search history.

(56) References Cited

U.S. PATENT DOCUMENTS

| | | | | | |
|---|---|---|---|---|---|
| 735,113 | A | * | 8/1903 | Kelland | 188/24.18 |
| 2,460,204 | A | * | 1/1949 | Vacher | 188/24.21 |
| 3,861,714 | A | * | 1/1975 | Evans et al. | 280/202 |
| 4,391,352 | A | * | 7/1983 | Brown | 188/24.12 |
| 4,511,018 | A | * | 4/1985 | Scott | 188/24.12 |
| 4,552,251 | A | * | 11/1985 | Schoch | 188/24.21 |
| 5,299,664 | A | * | 4/1994 | Peters | 188/24.21 |
| 5,499,699 | A | * | 3/1996 | Chen | 188/24.21 |
| 5,626,209 | A | * | 5/1997 | Viola | 188/24.14 |
| 5,894,913 | A | * | 4/1999 | Sugimoto | 188/24.21 |
| 7,000,739 | B2 | * | 2/2006 | Ciamillo | 188/24.22 |

* cited by examiner

*Primary Examiner* — Bradley King
(74) *Attorney, Agent, or Firm* — David O. Simmons

(57) ABSTRACT

A light weight brake assembly for bicycles is disclosed. Some embodiments of the invention are designed to enhance assembly adjustability, for example to accommodate geometric variations that occur with various bicycle frame and wheel geometries. Some embodiments of the invention are designed to allow for a brake leverage that can be non-linear and capable of multiplying during brake actuation so that braking force increases more rapidly than brake lever force applied by the user. Some embodiments of the invention are designed to provide a brake sensitivity that is adjustable in use. Some embodiments provide for a quick-release functionality, for example by quickly increasing the gap between the two brake pads so that the wheel can be easily/quickly removed.

14 Claims, 21 Drawing Sheets

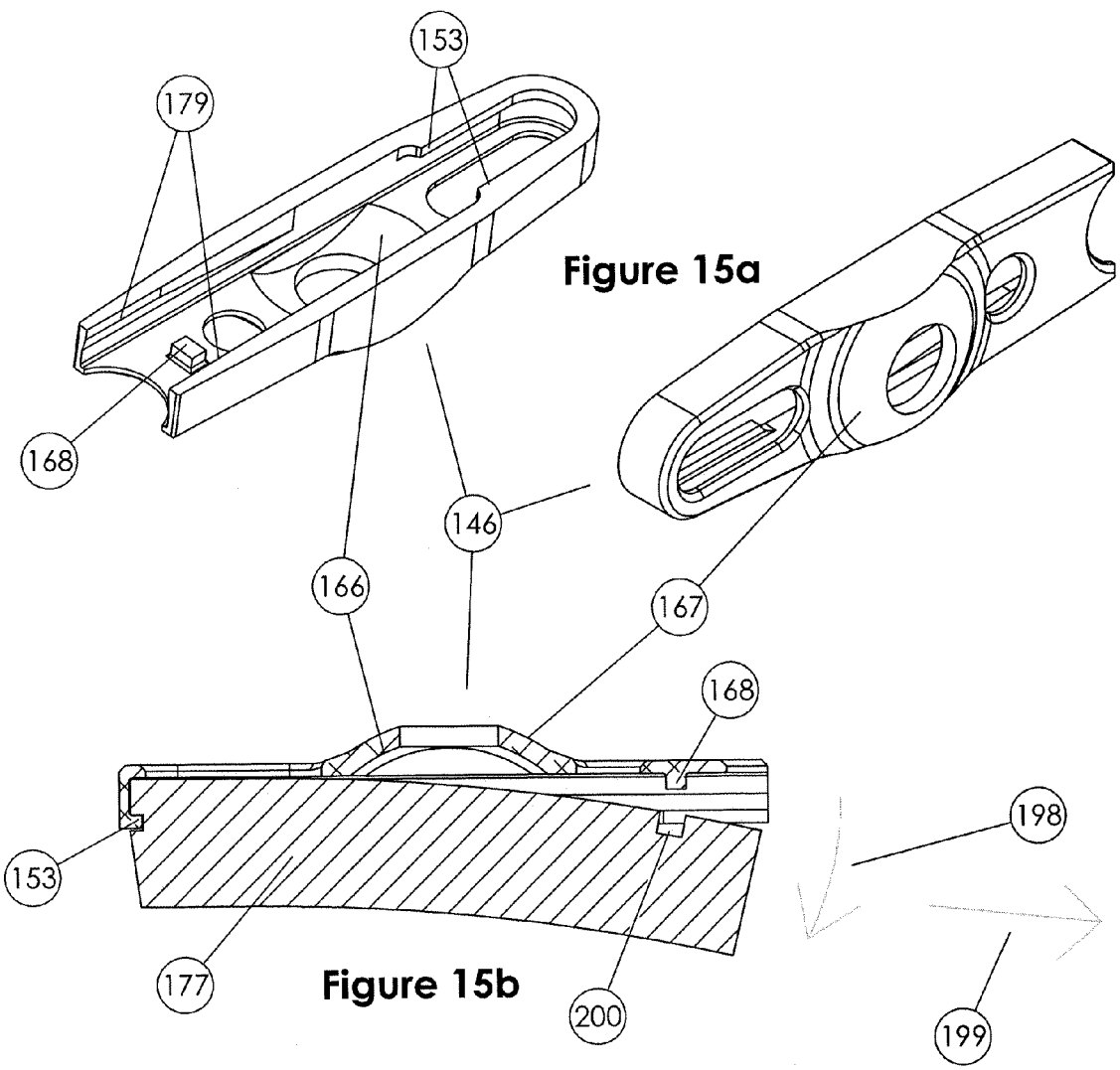
Figure 15a
Figure 15b
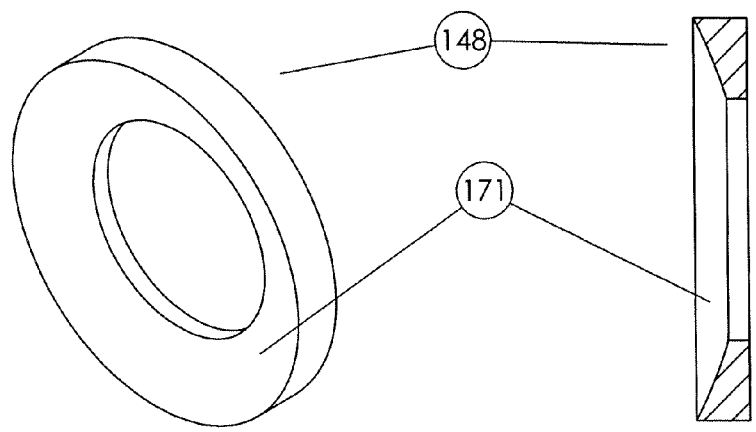
Figure 16

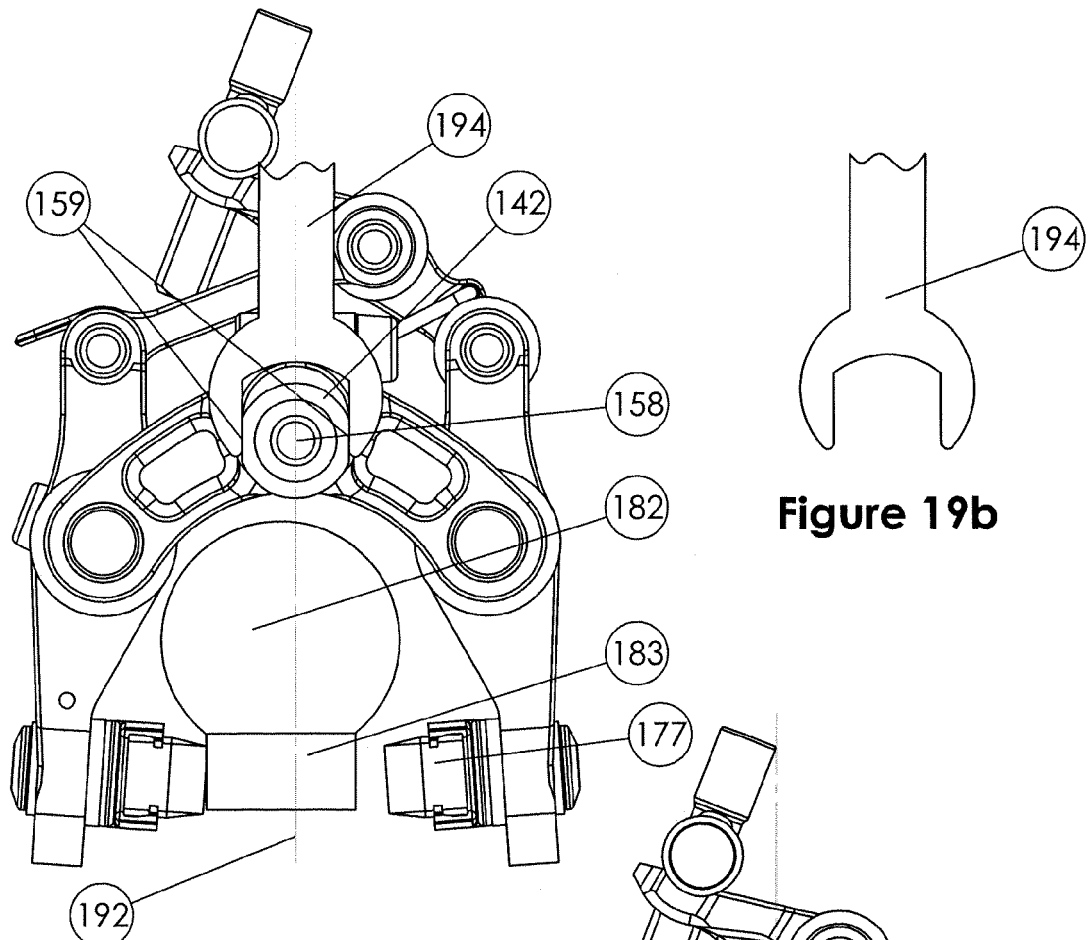
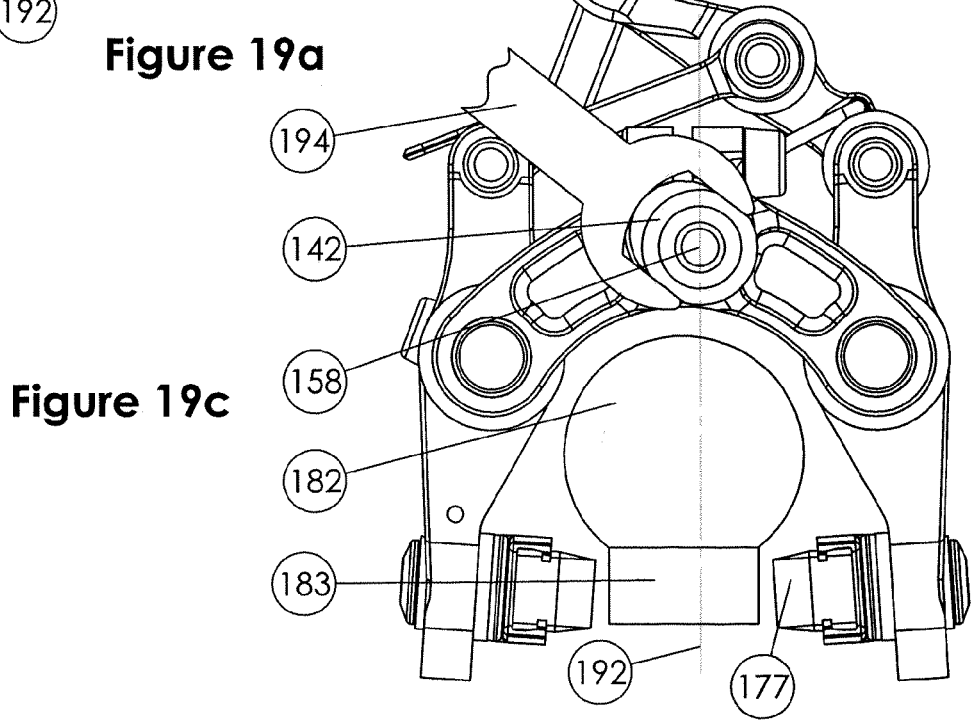
Figure 19a
Figure 19b
Figure 19c

LIGHT WEIGHT BICYCLE BRAKE ASSEMBLY

REFERENCE TO RELATED APPLICATIONS

This application claims priority under Section 119(e) from U.S. Provisional Application Ser. No. 60/975,163 filed Sep. 26, 2007, the contents of which are incorporated herein by reference.

FIELD OF THE INVENTION

The invention described herein relates to bicycle brake assemblies and, in particular, to cable actuated assemblies which act upon the rim of a bicycle wheel.

BACKGROUND OF THE INVENTION

Bicycling is an increasingly popular form of recreation and a means of transportation and has become a popular competitive sport for both amateurs and professionals. Whether a bicycle is designed for use in recreation, transportation or competition, making of improvements to the various components of bicycles designed for these activities continues to be a focus of many in this field.

One component of bicycles that has been extensively redesigned is the bicycle brake assembly. Consequently, there are many different designs, configurations and elements of bicycle brake assemblies known in the art. For example, in recent years, braking systems have been designed for use with bicycles that include braking discs mounted to one of the wheels of the bicycle in combination with actuated brake caliper assemblies (see, e.g. U.S. Pat. No. 7,261,188). Such brake caliper assemblies typically include elements such as hydraulically operated pistons that can for example, engage a pair of braking pads that in turn selectively contact a braking disc.

Other illustrative bicycle brake assemblies that are known in the art include for example, those described in U.S. Pat. No. 4,718,521, which discloses a bicycle caliper brake assembly having a first caliper having a connecting portion provided with a boss rotatably and axially movably receiving a rotary member. Similarly, U.S. Pat. No. 6,125,973 discloses a brake pad holder designed for adjustably mounting a bicycle brake pad to a brake caliper arm. In this assembly, the brake pad holder is designed to maintain the mounting arm thereof in an orthogonal orientation with respect to the brake caliper arm, while the brake pad holder is adjustable. U.S. Pat. No. 6,264,008 discloses a parallel-push brake assembly for bicycles that provides substantially translational motion of the brake pad using a mechanism that is relatively free of tolerance build-up or slop. U.S. Pat. No. 6,607,056 discloses a brake apparatus for a bicycle capable of applying a higher braking force on the front wheel and a lower braking force on the rear wheel given the same force exerted on the levers controlling the front brake and the rear brake so to prevent early locking of the rear wheel of the bicycle during braking while leaving the cyclist the possibility to separately control the front brake and the rear brake. U.S. Pat. No. 7,353,918 discloses a brake assembly for a bicycle composed of an arrangement of a pair of brake pads each connected to a rod member in turn guided for axial movement by a base fixed on the bicycle frame.

While a variety of bicycle brake assemblies are known in the art, there exists a need for an improved brake assemblies, ones that for example allow for an optimized distribution of the forces associated with the operation of the assembly as well as ones that are easier to use and/or adjust than existing brake assemblies. Embodiments of the invention disclosed herein address this need in the art as well as other needs, which will become apparent from the following disclosure.

SUMMARY OF THE INVENTION

The bicycle brake assembly disclosed herein has a number of embodiments, for example, those that are illustrated in the drawings. Moreover, those of skill in the art will understand that numerous changes can be implemented to the construction and forms of the various elements used in the illustrative embodiments disclosed herein yet remain within the context of the concepts characterizing the embodiments of this invention. A typical embodiment of the invention is a cable actuated bicycle brake assembly comprising: an assembly mount; a cable; a cable housing; a stationary bridge; a first brake arm including a first brake pad, wherein the first brake arm is operatively coupled to the stationary bridge; a second brake arm including a second brake pad, wherein the second brake arm is operatively coupled to the stationary bridge; a stationary cable anchor; a cable housing anchor; wherein the cable, the cable housing, the stationary bridge, the first brake arm, the second brake arm, the stationary cable anchor and the a cable housing anchor are operatively coupled such that when the brake assembly is actuated by a user applying an actuating force to the cable, the actuating force applied to the cable actuates the first and the second brake arms so that the first and second brake pads apply a braking force to a bicycle wheel.

As demonstrated by the illustrative embodiments disclosed below and those shown in the drawings, such embodiments of the bicycle brake assembly can further include additional elements and/or arrangements of elements. For example, in certain embodiments, the assembly also includes a linkage comprising a pivotable lever and a strut, wherein the first and second brake arms are operatively coupled to each other by the linkage. In some embodiments, the lever comprises a first and a second end; the first end the lever is pivotally coupled to the first brake arm; the second end of the lever is coupled to the cable housing; the strut comprises a first end and a second end; the first end of the strut is pivotally coupled to the lever so as to allow the strut to pivot relative to the lever; and the second end of the strut is pivotally coupled to the second brake arm. In some embodiments, the cable housing can be operatively coupled to the lever so that a force applied to the cable is transferred to the cable housing such that the cable housing moves and actuates the lever so that the first and the second brake arms are actuated and the first and second brake pads apply a braking force to a bicycle wheel. In addition, in certain embodiments, the strut comprises a strut tip bearing surface and a strut quick release tab, wherein the strut tip bearing surface and the strut quick release tab facilitate an increase in the distance between the first and second brake pad. In some embodiments of the invention, the assembly comprises a mini-link, wherein the mini-link is operatively coupled to the stationary bridge, the lever and the strut so as to facilitate a consistent and/or an approximately equal movement of the first brake pad and the second brake pad upon actuation of the brake assembly by the user. Optionally, the length of the mini-link is adjustable.

In some embodiments of the invention, the stationary cable anchor is disposed on a stationary element of the assembly comprising: the assembly mount; the stationary bridge; a first or second brake arm axle; or an immobile portion of the first or second arm. Optionally, the brake assembly comprises a frame bolt adapted to secure the brake assembly to the bicycle; wherein the frame bolt exhibits an eccentric geometry that allows the brake assembly to be moved in a side-to-side direction and a up-and-down direction relative to a location on a bicycle on which the brake assembly is mounted so that an alignment of the brake assembly on the bicycle can be adjusted. In certain embodiments of the invention, the brake assembly comprises a barrel adjuster having a nut that matingly engages a surface on the lever such that the barrel adjuster can pivot relative to the lever during actuation of the brake assembly. In some embodiments, the brake assembly comprises a spring having a first end coupled to the first brake arm and a second end coupled to the second brake arm, wherein the spring is not coupled to a stationary portion of the brake assembly.

In certain embodiments of the invention, the stationary bridge has a front flange and a rear flange and the cable, the cable housing, the stationary bridge, the first brake arm, the second brake arm, the stationary cable anchor and the a cable housing anchor are operatively coupled to one another in an area disposed between these two flanges. In some embodiments, the brake assembly includes a sliding fit brake pad retention system comprising: a first shoe and a second shoe adapted to retain the first brake pad and the second brake pad, wherein the first and the second shoe comprise: a fixed boss element adapted to be seated in a recess of the first and second brake pads; wherein the recess is adapted to retain the first and second brake pads when they are slidingly engaged with the first and second shoe; and a relief in the first and second brake shoes that enables the brake pads to be deformably disengaged from the boss in a direction opposite of braking force.

Yet another embodiment of the invention is a cable actuated bicycle brake assembly comprising: an assembly mount; a cable; a cable housing; a stationary bridge; a first brake arm including a first brake pad, wherein the first brake arm is operatively coupled to the stationary bridge; a second brake arm including a second brake pad, wherein the second brake arm is operatively coupled to the stationary bridge; a linkage comprising a pivotable lever and a strut, wherein the first and second brake arms are operatively coupled to each other by the linkage; and a mini-link, wherein the mini-link is operatively coupled to the stationary bridge and the linkage so as to facilitate an approximately equal movement of the first brake pad and the second brake pad upon actuation of the brake assembly by the user; wherein the cable, the cable housing, the stationary bridge, the linkage, the mini-link, the first brake arm and the second brake arm are operatively coupled such that when the brake assembly is actuated by a user applying an actuating force to the cable, the actuating force applied to the cable actuates the first and the second brake arms so that the first and second brake pads apply a braking force to a bicycle wheel.

As demonstrated by the illustrative embodiments disclosed below and shown in the drawings, such embodiments of the bicycle brake assembly can further include additional elements and/or arrangements of elements. For example, some of these embodiments of the invention include a stationary cable anchor and/or a cable housing anchor. In some embodiments of the invention, the brake assembly comprises a frame bolt adapted to secure the brake assembly to the bicycle; wherein the frame bolt exhibits an eccentric geometry that allows the brake assembly to be moved in a side-to-side direction and a up-and-down direction relative to a location on a bicycle on which the brake assembly is mounted so that an alignment of the brake assembly on the bicycle can be adjusted.

Yet another embodiment of the invention is a cable actuated bicycle brake assembly comprising: an assembly mount; a cable; a cable housing; a stationary bridge; a first brake arm including a first brake pad, wherein the first brake arm is operatively coupled to the stationary bridge; a second brake arm including a second brake pad, wherein the second brake arm is operatively coupled to the stationary bridge; a frame bolt adapted to secure the brake assembly to the bicycle; wherein the frame bolt exhibits an eccentric geometry that allows the brake assembly to be moved in a side-to-side direction and a up-and-down direction relative to a location on a bicycle on which the brake assembly is mounted so that an alignment of the brake assembly on the bicycle can be adjusted; wherein the cable, the cable housing, the stationary bridge, the first brake arm and the second brake arm are operatively coupled such that when the brake assembly is actuated by a user applying an actuating force to the cable, the actuating force applied to the cable actuates the first and the second brake arms so that the first and second brake pads apply a braking force to a bicycle wheel.

As demonstrated by the illustrative embodiments disclosed below and those shown in the drawings, such embodiments of the bicycle brake assembly can further include additional elements and/or arrangements of elements. For example, some of these embodiments of the invention include a stationary cable anchor and a cable housing anchor. In certain embodiments of the invention, the assembly comprises: a linkage comprising a pivotable lever and a strut, wherein the first and second brake arms are operatively coupled to each other by the linkage; and a mini-link, wherein the mini-link is operatively coupled to the stationary bridge, the lever and the strut so as to facilitate an approximately equal movement of the first brake pad and the second brake pad upon actuation of the brake assembly by the user.

Some embodiments of the invention include kits comprising a bicycle brake assembly disclosed herein. Typically the kit further comprises instructions for use of the enclosed assembly, and optionally, one or more tools commonly used to mount and/or adjust such assemblies (e.g. levers, wrenches, screwdrivers and the like).

Those of skill in the art also understand that embodiments of the invention include methods for making (e.g. using art accepted manufacturing techniques) and using the various assembly embodiments disclosed herein. Such embodiments of the invention include for example methods of stopping or slowing a bicycle by applying a braking force to a bicycle wheel comprising applying an actuating force to the cable of a bicycle brake assembly embodiment disclosed herein.

BRIEF DESCRIPTION OF THE FIGURES

Further characteristics and advantages of embodiments of the invention will be discerned from the non-limiting illustrated examples that are shown in the drawings, in which:

FIG. 15a shows perspective views of brake shoe (146)—clearly defining inner spherical surface (166), outer spherical surface (167), the brake shoe boss (168), the shoe undercut (201), the shoe undercut relief (179). Inner spherical surface (166) and outer spherical surface (167) provide bearing surfaces for mating to threaded insert spherical surface (169) of threaded insert (147) (see also FIG. 14) and spherical washer spherical surface (171) or spherical washer (148) (see also FIG. 16).

FIG. 15b shows a section view of brake shoe (146) along with a brake pad (177) that has been deformed in the manner necessary for pad removal. Also defined are embodiments of the inner spherical surface (166), outer spherical surface (167), brake shoe boss (168), the brake shoe boss (168), the shoe undercut (153), the pad's boss recess (200), the shoe undercut relief (179), the peal force (198) vector, and the slide force (199) vector.

FIG. 16 shows perspective and section views of spherical washer (148) to define spherical washer spherical surface (171).

FIGS. 19a, 19b and 19c are rear views of front brake assembly (102) or rear brake assembly 103. Shown is the side-to-side adjustment available by rotating frame bolt (142) about frame bolt threaded portion (158) using frame bolt swivel tool (194) engaged with frame bolt flats (159). 19a shows the position of front brake assembly (102) or rear brake assembly (103) relative to a misaligned generic tire cross section (182) and generic wheel rim cross section (183) prior to adjustment. Frame bolt swivel tool (194) is in place. FIG. 19b shows an example tool used to engage with frame bolt flats (159). FIG. 19c shows front brake assembly (102) or rear brake assembly (103) relative to generic tire cross section (182) and generic wheel rim cross section (183) after adjustment with frame bolt swivel tool (194) was used to rotate frame bolt (142). Also shown in 19a and 19c is bicycle centerline (192). Bicycle centerline (192) line does not move from 19a to 19b.

DETAILED DESCRIPTION OF THE INVENTION

Figure 1:
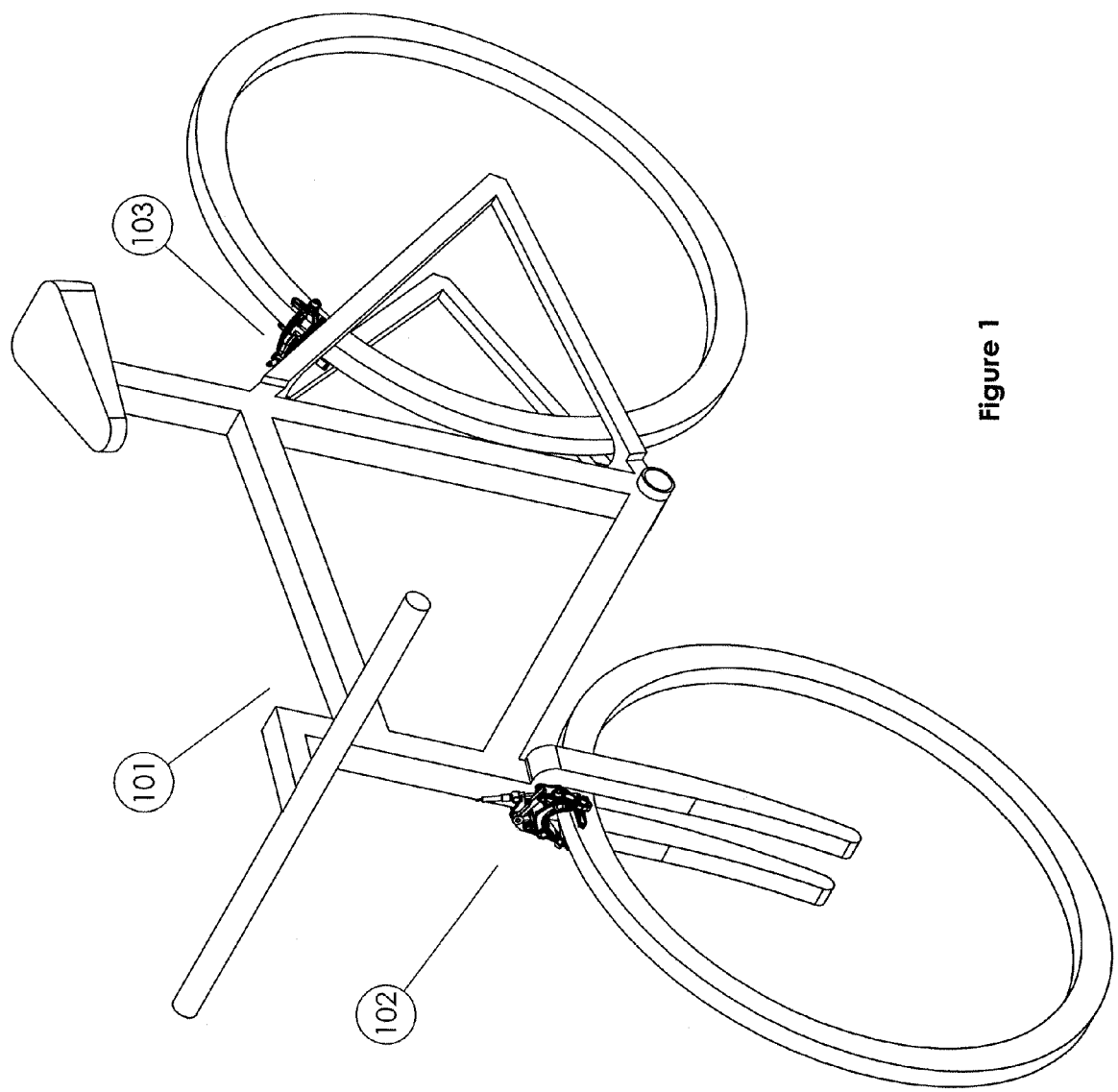
FIG. 1 is a perspective view of the left side of bicycle (101) with front brake assembly (102) and rear brake assembly (103) installed.

Unless otherwise defined, all terms of art, notations and terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. The techniques and procedures described or referenced herein are generally well understood and commonly employed using conventional methodology by those skilled in the art.

1. Features of Embodiments of the Invention

The disclosure herein provides bicycle brake assemblies having elements and arrangements of elements that are designed optimize a number of functional attributes of such assemblies. For example, certain embodiments focus on designs that improve on conventional bicycle brake assemblies by decreasing their weight while simultaneously improving functional aspects of a number of elements within the assembly. In this context, embodiments of the invention focus on the optimization of conventional brake assembly elements. For example, some embodiments of the invention are designed to enhance assembly adjustability, for example to accommodate geometric variations that occur with various bicycle frame and wheel geometries. Some embodiments of the invention are designed to allow for a brake leverage that can be non-linear and capable of multiplying during brake actuation so that braking force increases more rapidly than brake lever force applied by the user. Some embodiments of the invention are designed to provide a brake sensitivity that is adjustable in use. Some embodiments provide for a quick release functionality, for example by quickly increasing the gap between the two brake pads so that the wheel can be easily/quickly removed. Those of skill in the art will understand that embodiments of the invention allow for an easy installation and maintenance, for example by incorporating one or more of the features disclosed herein (e.g. those noted above).

In order to minimize the weight of the assemblies of the invention, embodiments of the assembly disclosed herein use alternative elements and arrangements of elements that are designed to maximize the brake's assemblies structural efficiency by for example, the elimination of extra elements and/or the elimination of eccentric loads that cause elements to be large in cross-section (e.g. in order to preserve brake performance and stiffness). For example, various embodiments of the invention include elements and constellation of elements that, for example differ from assemblies known in the art due to altered designs in one or more features such as: brake cable end and cable housing actuation; brake leverage; brake pad travel control; brake alignment relative to the bicycle frame and wheel; brake shoe and brake pad replacement; cable housing termination (e.g. using elements such as a barrel adjuster); and brake quick release elements.

As noted briefly below, embodiments of the invention disclosed herein overcome a number of problems with existing bicycle brake assemblies. In this context, the following text provides a brief description of common assembly embodiments known in the art, how the brake assembly designs disclosed herein provide improvements over such assemblies, and how the various elements function to accomplish these improvements.

In many conventional brake assemblies known in the art, a cable is routed through a cable housing from the brake lever to the brake. In such arrangements, the user applies the braking force to the brake lever by hand and this force is transferred to the brake assembly via the cable and cable housing where this force is transferred to the rim of the wheel. Such embodiments typically include two movable levers upon which force is applied to actuate the brake. The cable housing is terminated on one of these two movable levers and the cable is terminated on the other movable 'lever'. In such embodiments, when the brake is activated, the brake cable is pulled back up through the cable housing shortening the distance between the two movable levers and resulting in a scissoring action that acts to bring the brake pads together to apply the stopping force against the wheel. In these prior art assemblies, the brake assembly arms are assembled on top of one another. While effort is taken to minimize eccentric loads in these prior art devices, they are not eliminated. Other assemblies known in the prior art teach a cable housing that is terminated at the end of rigid arm extending from the main body of the brake and adding weight to the brake assembly. In such assemblies, the brake cable is then passes through the cable housing and is fixed to a movable linkage. When the cable is pulled, the linkage is pulled up toward the fixed cable housing termination (e.g. anchor), and a scissoring action occurs to activate the brake. In contrast to these prior art designs, embodiments of the brake assemblies disclosed herein are designed to include one movable lever upon which force is applied to actuate the brake. Such embodiments of the invention can be much lighter than the prior art assemblies because they are designed to use one rather than two movable levers while not requiring any extension of the main body of the brake. Additionally, such designs can reduce and/or eliminate eccentric loads attributed to brake assembly arms being assembled on top of one another so that elements/members of the assemblies can have smaller cross sections without compromising brake performance and/or stiffness.

In addition, bicycle brake assemblies known in the art generally follow one of several approaches to create the leverage necessary to provide braking power, namely: basic scissors linkage, dual pivot linkage or center pull linkage. As is known in the art, the basic scissors linkage is very simple approach, with two movable arms pivoting about and contacting at just one axis. In such prior art designs, in order to provide higher leverage with this approach, there is no alternative but to increase the length of the arms, resulting in a structure with longer, bulkier and heavier or more flexible elements. The dual pivot linkage design adds an additional contacting interface between the two arms. In this context, such prior art designs are essentially the same as the basic scissor design, but with a second contact point, which results in an increased leverage as one arm pushes on the other during activation. The center pull linkage design is yet another simple approach similar to the basic scissor linkage with 2 arms actuated by a cable (or a split cable). The difference between this prior art design and the basic scissor linkage is that the two arm rotate about two independent axis. This prior art design consequently has a number of the same shortcomings as the scissors design in that there is no way of increasing leverage other than increasing the length of its elements. The center pull/sliding wedge is one illustrative variation on this design (e.g. as found in the Shimano Ax). In contrast to these prior art assemblies, embodiments of the brake design that is described herein offer a range of leverage opportunities—from relatively linear (remaining~constant throughout brake actuation) to highly non-linear (where the leverage is multiplied as the brake is actuated further) without requiring the arms to get longer.

In many bicycle brake assemblies common in the art, it is also desirable for brake pads to move symmetrically about the centerline of the wheel. Many brake assemblies known in the art use a spring system to try to control arm movement by providing an equal spring force on each arm. In doing so, it is assumed that when an equal cable force is applied to both arms, both arms will move the same distance. In practice with these prior art devices however, due to many subtle differences in friction, force applied and/or preload from one brake arm to the other is not consistent throughout activation and is a shortcoming of bicycle brake assemblies that artisans have focused on for some time. A dual pivot design is one way to overcome this shortcoming. With one arm pushing on the other during activation, this design can overcome the subtle differences mentioned above and results in each arm consistently moving the same distance relative to each other. In contrast to these prior art designs, embodiments of the brake assemblies disclosed herein are designed to include a constellation of elements that allows for a consistently repeatable, equal brake arm motion.

In addition, in many conventional brakes, vertical adjustment of the brake pads relative to the frame is done by moving the pad up or down in slots on the brake arms. With the large range of vertical adjustment needed due to variations in bicycle and wheel geometries, the slots in the arms are typically large and using up all of the range can result in large changes in brake leverage (e.g. as much as 50%). For horizontal adjustment in such prior art assemblies, the entire brake is typically rotated at the mounting bolt to the optimal orientation and then the frame bolt is tightened so that the brake stays in place. Such prior art designs prove problematic because the when tightening the frame bolt, the entire brake tends to rotate, a phenomena which can result in taking the brake out of correct alignment with the wheel. In contrast to such prior art designs, embodiments of the brake assemblies disclosed herein are designed to employ an eccentric frame bolt, an element that for example, provides a more consistent brake leverage throughout vertical adjustment range, minimizes brake structure, and allows for a pure horizontal adjustment that is not easily taken out of alignment when the brake is tightened in place.

Many conventional brake shoes used in bicycle brake assemblies of the prior art keep their pads in place by one of two approaches: friction fit; or use of a removable keeper element. In the friction fit design, the pad is forced into a slot overcoming friction of the tight fit. This prior art design offers the simplicity of fewer parts as there are no screws or no tools needed. The drawback of this design is the high friction required to keep the pad in place can make the pads very difficult to install and or remove by hand (many times requiring tools which can exert the forced needed to install and remove the pad). In the removable keeper element design, the pad is slipped into a slot and retained by installing a screw or pin in the shoe which extends into a corresponding recess in the pad. Thus, the pad stays in place because the screw or pin effectively blocks the pad from sliding back out the slot. This design provides for easier (by hand) removal and installation of the pad as the pad is a slip fit; but requires tools and an extra step to remove and install the retaining screw or pin. In contrast to these prior art designs, embodiments of the brake assemblies disclosed herein are designed to provide a "nested" brake shoe/pad design, one that is easy to install without requiring extra parts or tools.

In many conventional brake assemblies known in the art, the cable housing terminates in a recessed bore of an adjustment screw which has a coaxial hole that allows the cable to pass through. In such prior art designs, the screw and corresponding nut are fixed to one of the movable levers allowing adjustment of the effective cable housing length. In such designs as the brake is actuated, the arm moves and with it, the screw also moves, changing the angle of the screw relative to the cable termination point. Ideally in such designs, the screw axis move to always be aligned with the cable termination point minimizing friction and leverage changes caused by mis-alignment. When such conventional brake assemblies are activated, there is only one instance in which the barrel adjust is aligned with the cable termination point. Unfortunately, this can lead to binding/kinking of the brake cable causing friction, wear and loss of leverage. In contrast to these prior art designs, embodiments of the brake assemblies disclosed herein are designed to allow the cable and cable housing to remain aligned throughout brake actuation minimizing binding/kinking.

In addition, in many road brakes of the prior art, the 'quick release' functionality is provided in one of two ways: 1) either with a cam/eccentric system which when actuated effectively lengthens the brake cable thus opens the space between the pads for wheel removal and replacement; or 2) by using a pin at the brake lever that effectively increases the length of the cable itself. While both of these prior art designs are relatively easy to use, they have limited opening capacity, a property that often results in a tight squeeze during wheel removal and replacement. In contrast to such prior art designs, embodiments of the brake assemblies disclosed herein are designed to provide a quick release that opens wide enough for relatively wide tires to fit through without requiring additional structure to do so.

2. Generalized Embodiments of the Invention

The invention disclosed herein comprises a number of embodiments. A typical embodiment is a cable actuated bicycle brake assembly comprising: an assembly mount; a cable; a cable housing; a stationary bridge; a first brake arm including a first brake pad, wherein the first brake arm is operatively coupled to the stationary bridge; a second brake arm including a second brake pad, wherein the second brake arm is operatively coupled to the stationary bridge; a stationary cable anchor; and a cable housing anchor; wherein: the cable, the cable housing, the stationary bridge, the first brake arm, the second brake arm, the stationary cable anchor and the a cable housing anchor are operatively coupled such that when the brake assembly is actuated by a user applying an actuating force to the cable, the actuating force applied to the cable actuates the first and the second brake arms so that the first and second brake pads apply a braking force to a bicycle wheel.

In embodiments of the invention, the term "stationary" as used for example to refer to stationary elements such as "a stationary cable anchor" is used according to its art accepted meaning of being and remaining fixed at one location on the bicycle brake assembly, e.g. located on an element of the brake assembly that does not move as a part the operation of the brake assembly (e.g. the assembly mount; or the stationary bridge). In comparison to the stationary cable anchor, the cable housing anchor is not stationary and is instead located on an element of the brake assembly whose motion is an intrinsic part of the brake assembly's actuation. In embodiments of the invention, the term "immobile" as used for example to refer to immobile regions on the assembly such as "an immobile portion of the first or second arm" means an element that is immobile (i.e. stationary) as well as those portions of the assembly that are essentially immobile during the operation of the brake assembly such as an axis on which the first or second arm pivots. Typically, an essentially immobile region is one that moves to a marginal or de minimis extent such that that an element coupled to an essentially immobile region performs as if it were coupled to an absolutely immobile region. Further, this de minimis motion is not an intrinsic part of the brake assembly's actuation during its operation.

Figure 10:
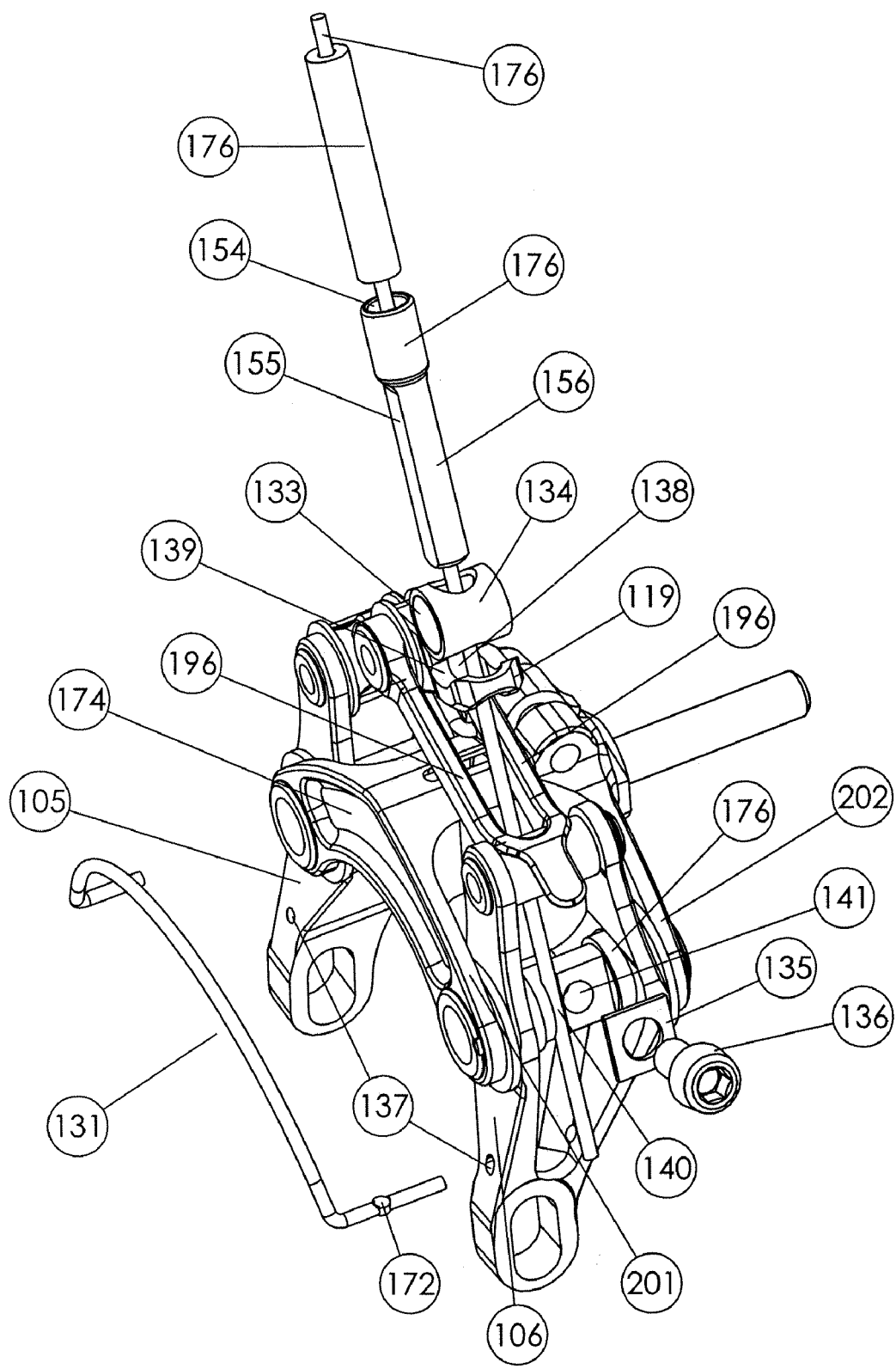
FIG. 10 is an exploded perspective view showing a further stage of assembly. Here spring (131) is attached to lever arm (105) and strut arm (106) at spring hole (137). The flattened portion of the spring (172) that can only slide into the ob-round spring hole (137) in one of two orientations so that the spring cannot come out of the arm during use. This together with the spring leg (161) work to keep spring (131) held in place. Barrel adjuster (132) goes through barrel adjuster bushing (134) and barrel adjuster threaded portion (156) is threaded into barrel adjuster nut (133). Barrel adjuster (132) is then passed through lever ob-round hole (138) with barrel adjuster flats (155) aligned with the flats of lever ob-round hole (138) until barrel adjuster bushing (134) comes to bear on barrel adjuster bushing bearing surface (139). Barrel adjuster flats (155) keeps barrel adjuster (132) from rotating during use and barrel adjuster bushing (134) is used to limit rotational friction between barrel adjuster bushing bearing surface (139) and barrel adjuster nut (133). The next step is to pass cable (176) through cable housing (175), barrel adjuster (132), barrel adjuster nut (133), barrel adjuster bushing (134), and lever ob-round hole (138) and laid into cable bearing surface (140). Cable (176) is tensioned until the end of cable housing (175) comes to bear against the bottom of cable housing hole (154). To hold cable (176) is the proper location, cable plate (135) is clamped down on cable (176) by threading cable bolt (136) into cable bolt hole (141). This embodiment of the invention also shows a strut design composed of two arms. These two strut arms (196) enable the strut to be tied to either side of the lever and the cable to be routed between the two strut arms (196). This eliminates any eccentric loading thus allowing both the lever and the strut to be smaller (because they are more structurally efficient) and therefore lighter.
Figure 11:
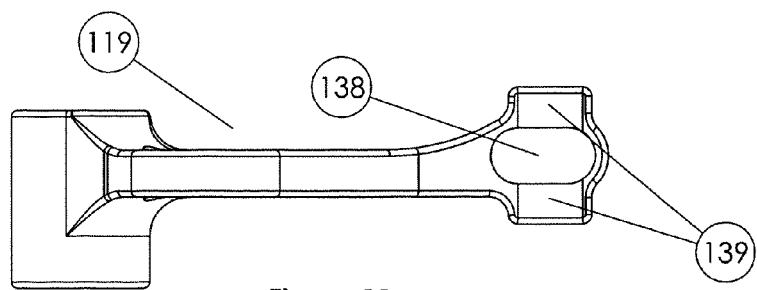
FIG. 11 shows a top view of lever (119). Lever ob-round hole (138) and barrel adjuster bushing bearing surface (139) are also shown for further clarity.
Figure 12:
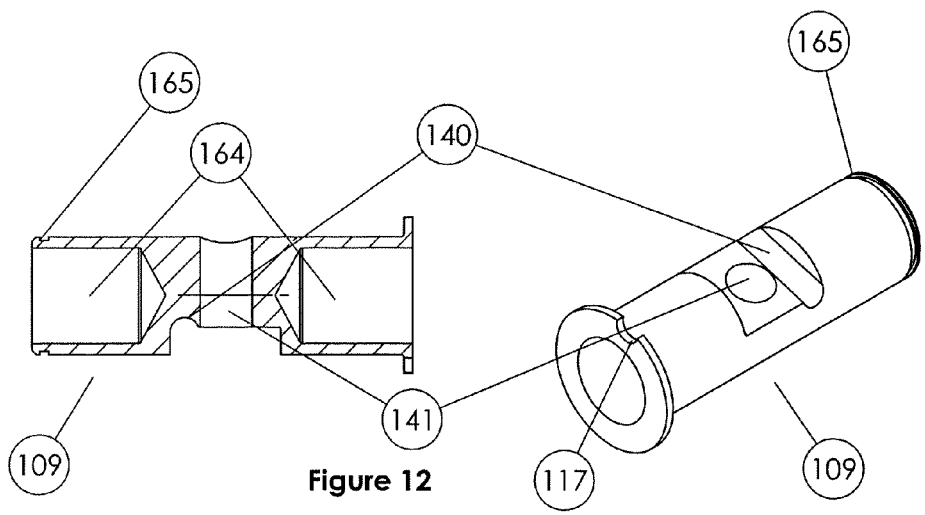
FIG. 12 shows a section and perspective view of strut arm axle (109). Snap ring undercut (165), cable bearing surface (140), cable bolt hole (141), hollow axle section (164) and strut arm axle index notch (117) are shown for further clarity. Snap ring undercut (165) is a typical snap ring groove that exists on lever arm axle (108), strut tip axle (110) and lever axle (121) as well. During assembly, a snap ring is inserted into snap ring undercut (165) to hold the various axles in place. Hollow axle section (164) is typical of all of the axles in the assembly where material is removed for weight savings.

Illustrative embodiments of a stationary cable anchor within a constellation of larger elements are shown in FIGS. 10 and 12 (see, e.g. element 109, 135, 136, 140 and 141). Illustrative embodiments of a cable housing anchor within a constellation of larger elements are shown in FIG. 10 (see, e.g. elements 132 133 and 134). The term "assembly mount" in such embodiments of the invention is a general term that refers to the element or element(s) that mount the bicycle brake assembly on the bicycle. A typical assembly mount of the invention can include for example one or more nut elements, bolt elements, washer elements and the like.

Figure 3:
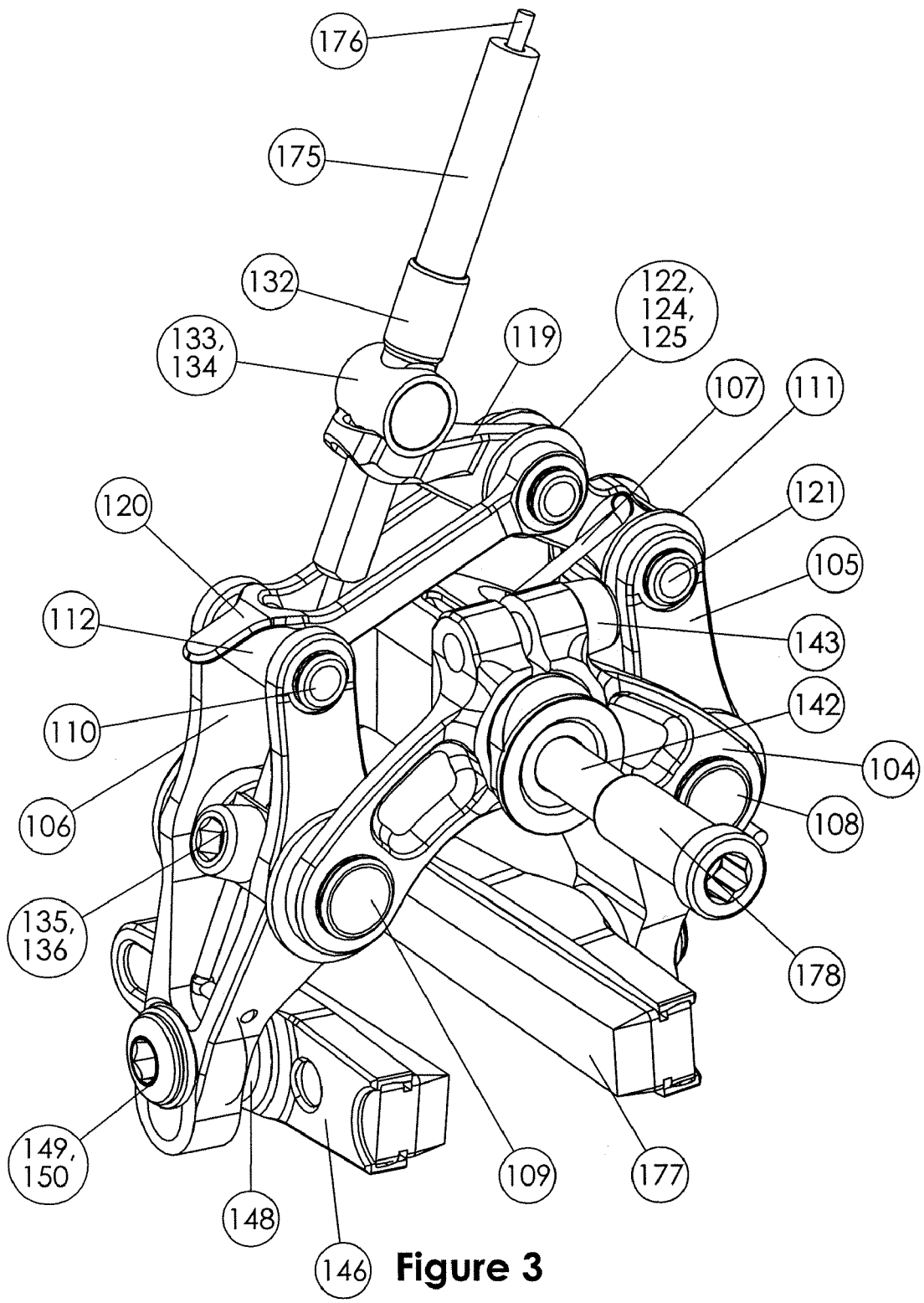
FIG. 3 is a rear perspective view of front brake assembly (102). All components are shown except for spring (131) which in only viewable from the front.
Figure 4:
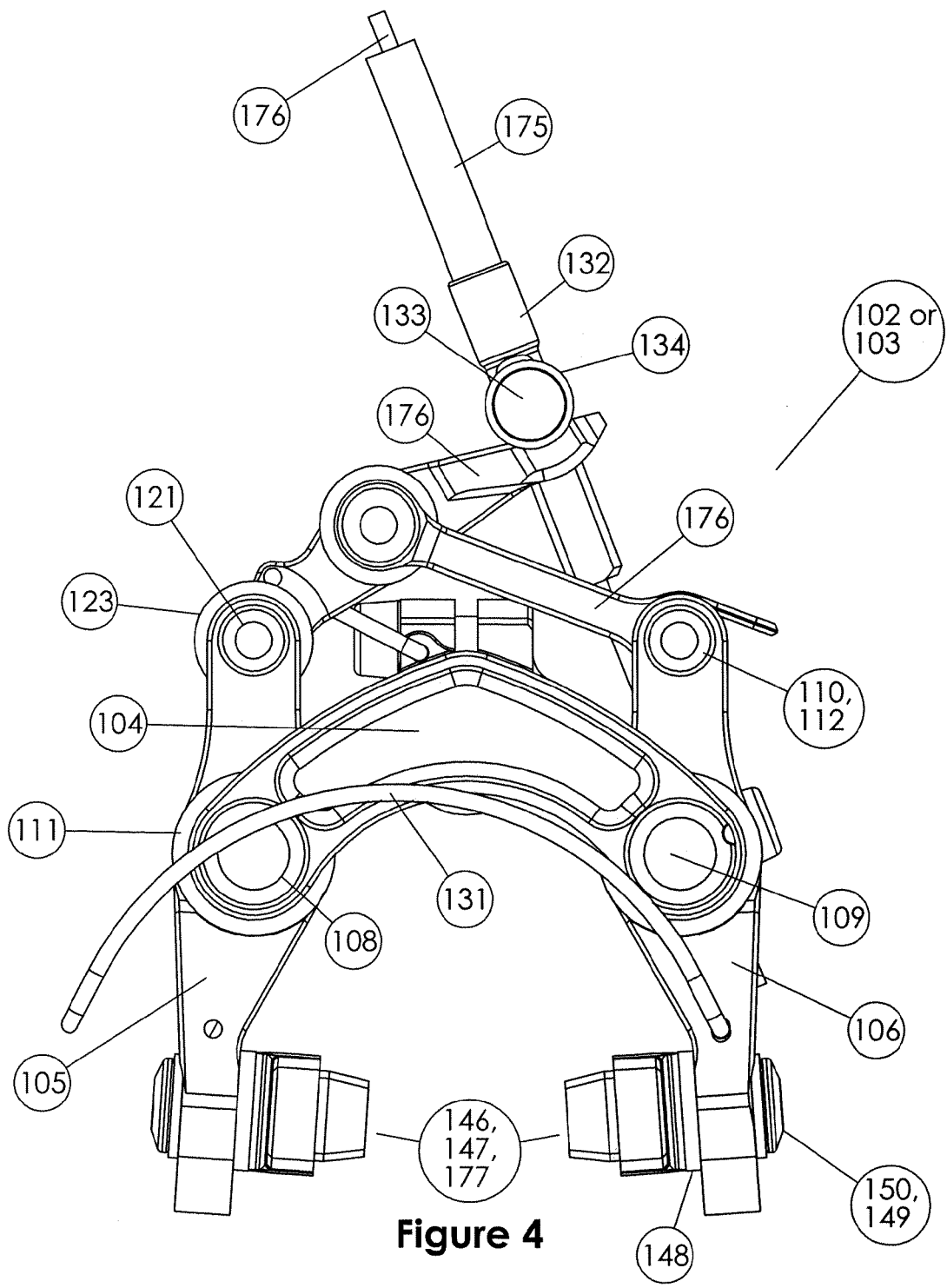
FIG. 4 is a front view of front brake assembly (102) or rear brake assembly (103). All components are shown except for frame bolt (142), binder bolt (143), threaded insert (147) and mini-link (107).
Figure 5:
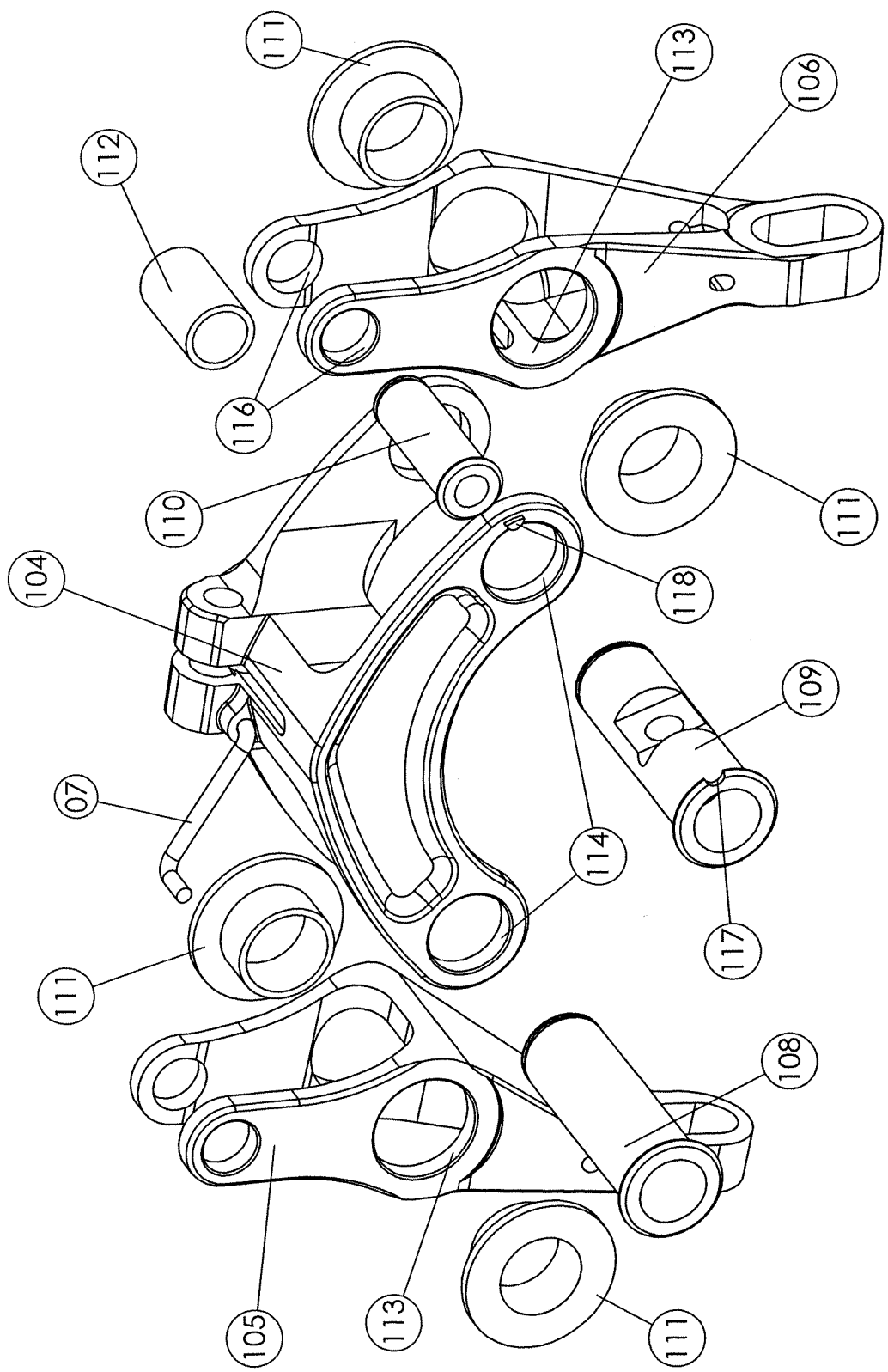
FIG. 5 is an exploded perspective view showing a first stage of assembly for front brake assembly (102) or rear brake assembly (103). Lever arm (105) is pined to bridge (104) using lever arm axle (108) which bears on bridge axle bearing surface (114). The arm bushing (111) is also installed in order to limit friction between arm bushing bearing surface (113) and lever arm axle (108) and allowing lever arm (105) to pivot about lever arm axle (108) relative to bridge (104). In a similar fashion, strut arm (106) is pined in place using strut arm axle (109) and arm bushing (111). Strut arm axle index notch (117) mates with bridge axle keying feature (118) to ensure that strut arm axle (109) and remains correctly oriented relative to bridge (104). Strut tip axle (110) is also installed into strut arm (106) bearing against strut tip axle bearing surface (116). Strut tip bushing (112) is also included to limit fiction in subsequent assembly (FIG. 6). Mini-link (107) is also installed into mini-link insert hole (115). Note that in this design, the two main pivoting arms, the lever arm (105) and strut arm (106), nested between the front and rear flanges of the stationary bridge (104) eliminating any eccentric loading and resulting in a more efficient structure than the prior art.
Figure 6:
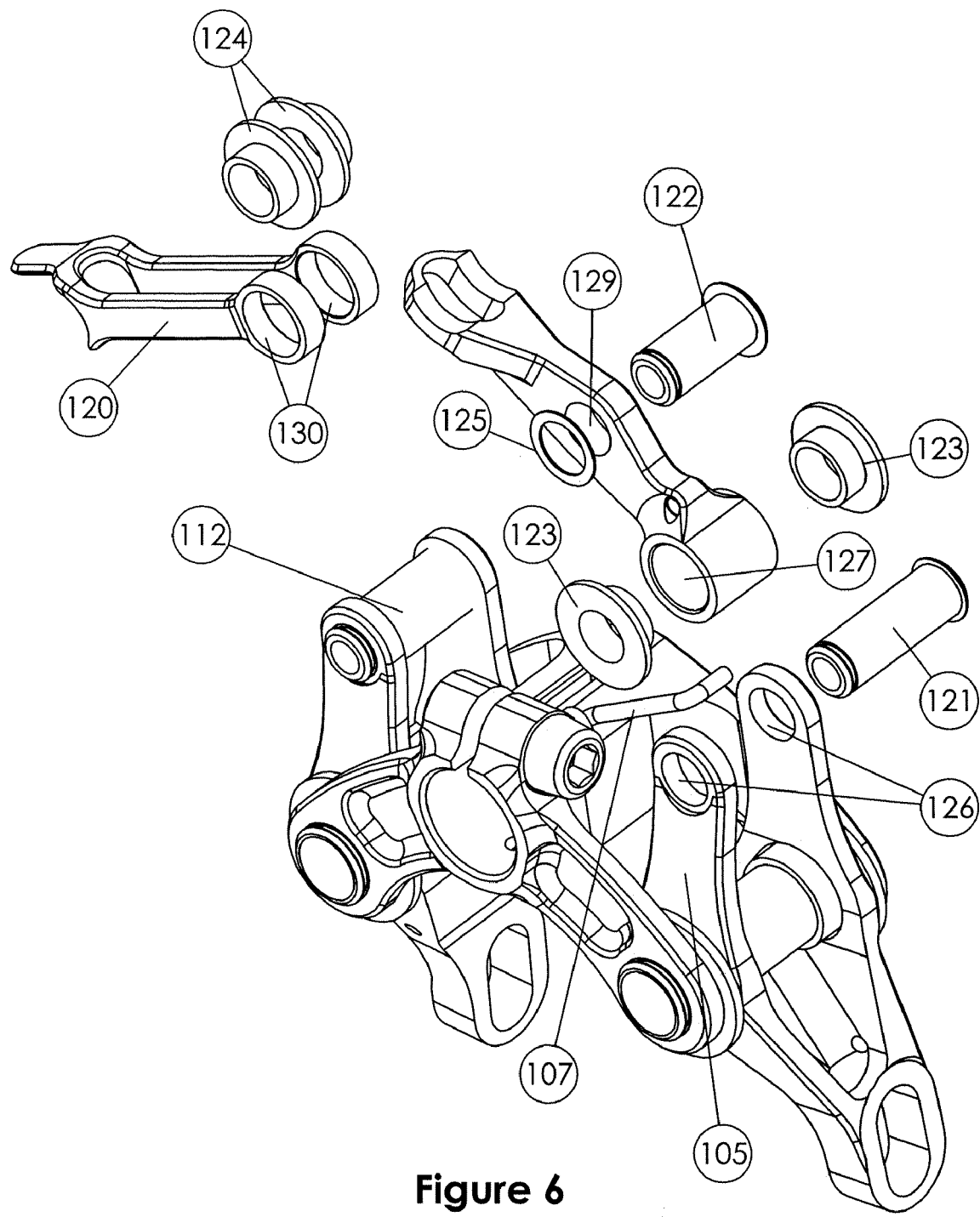
FIG. 6 is an exploded perspective view showing a further stage of assembly lever bushing (123) is installed into lever bushing bearing surface (127), mini-link lever hole (128) is slid over mini-link (107), and lever (119) is pined to lever arm (105) using lever axle (121) which bears on lever axle bearing surface (126). The lever bushing (123) is used to limit friction so that lever (119) ability to pivot about lever axle (121) is only limited by mini-link (107). Strut bolt bushings (124) are placed in strut bolt bushing bearing surface (130) and strut (120) is bolted to lever (119) by sliding the strut bolt (122) with strut bolt washer (125) into strut bolt hole (129) and fixing it in place with a snap ring. Strut bolt bushing (124) is used to limit friction between strut (120) and lever (119). Strut (120) is positioned so that strut tip bearing surface (173) comes to bear on strut tip bushing (112). The added linkage, the lever (119) and strut (120), like the rest of the moving elements, is nested between the front and rear flanges of the stationary bridge (104), eliminating any eccentric loading and resulting in a very efficient structure.

In certain embodiments of the invention, the assembly includes a linkage comprising a pivotable lever and a strut, wherein the first and second brake arms are operatively coupled to each other by the linkage. In typical embodiments of the invention, the first and second brake arms are operatively coupled to each other and the cable housing via the linkage. Illustrative representations of this embodiment are shown for example in FIGS. 3, 4 and 6 (see, e.g. elements 105, 106, 119, 120, 132, 133, 134, and 176). In some embodiments of this brake assembly, the lever comprises a first and a second end; the first end the lever is pivotally coupled to the first brake arm; the second end of the lever is coupled to the cable housing; the strut comprises a first end and a second end; the first end of the strut is pivotally coupled to the lever so as to allow the strut to pivot relative to the lever; and the second end of the strut is pivotally coupled to the second brake arm. In typical embodiments of the invention, the end of the lever that is coupled to the cable housing is the end at which the actuating force vector is applied to the cable housing during normal operation of the bicycle assembly. Illustrative representations of this embodiment are shown for example in FIG. 20 (see, e.g. element 105, 106, 119, 120 and 184). The strut and the lever jointly define displacement means coupled between a first end portion of a first brake arm and a first end portion of a second brake arm. It can be seen that a first actuation mode of the displacement means causes the brake arms to pivot with respect to the stationary bridge such that a distance between the first end portion of the brake arms increases and that a second actuation mode of the displacement means causes the brake arms to pivot with respect to the stationary bridge such that a distance between the first end portion of the brake arms decreases. It can also be seen that, during the first actuation mode of such a displacement means, the portion of the lever coupled between the strut and the attached one of the brake arms and the portion of the strut coupled between the lever than the attached one of the brake arms remain under a compressive loading as a result of the manner in which force is applied to the lever by the cable and the manner in which the strut, lever, and brake arms are pivotally coupled to each other.

Figure 24:
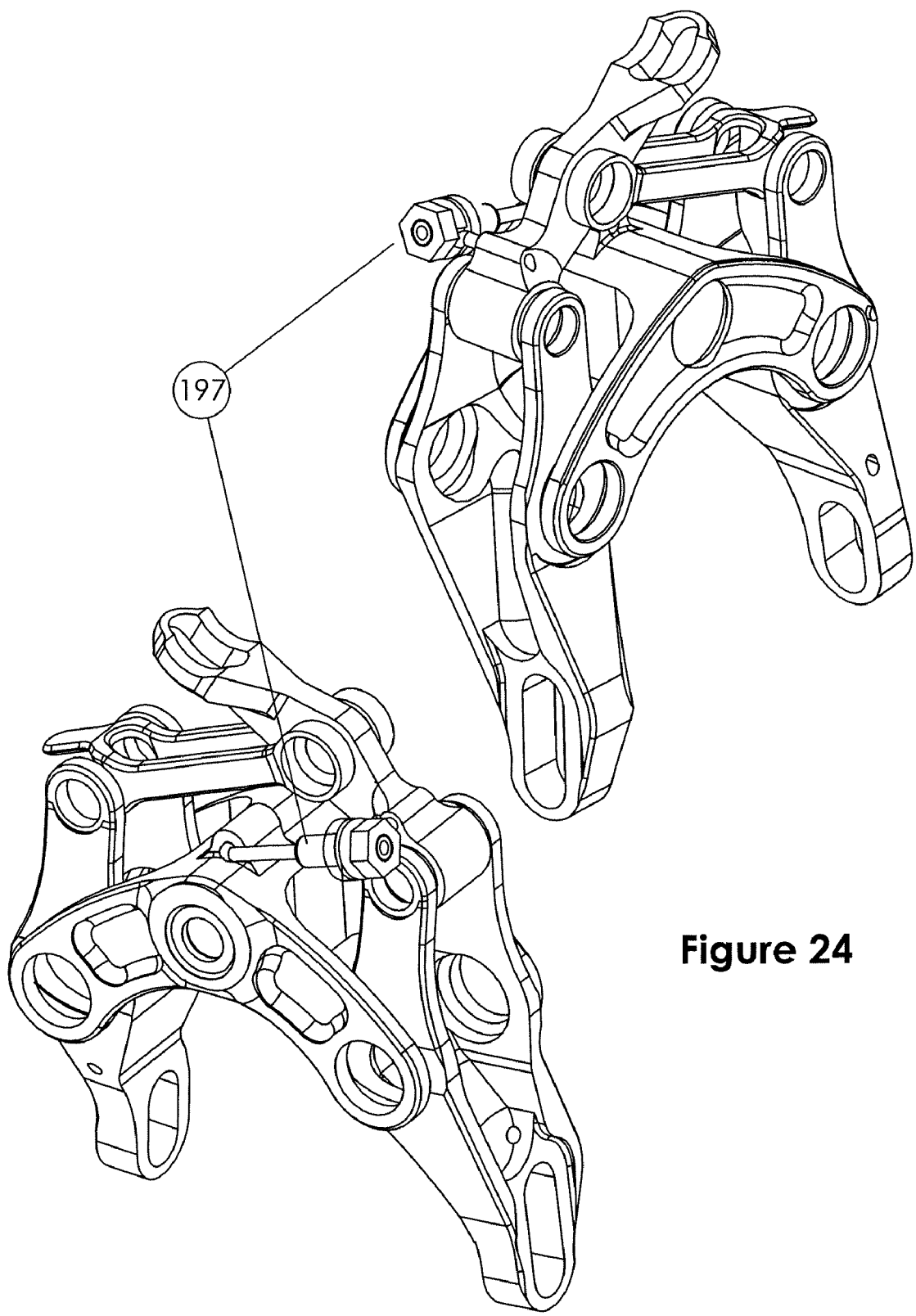
FIG. 24 shows an embodiment of the invention with an adjustable length mini-link (197) and no binder bolt (143). With an adjustable length of the mini-link (197) comes the ability to adjust how far brake pads (177) are from the rim (183). As the length of the mini-link is adjusted, one pad (177) moves closer to the rim (183) as the other pad moves farther away. If the length of the mini-link is adjusted in the opposite direction, the opposite motions occur. Therefore, but using an adjustable length mini-link (197) the rim (183) can be centered between the two pads without the need to move the entire brake.

Typically, the strut in the assembly can comprise a strut tip bearing surface and a strut quick release tab, wherein the strut tip bearing surface and the strut quick release tab facilitate keep the strut engaged with the second brake are during use. Typically these elements keep the linkage engaged during use and enable disengagement of this linkage to facilitate an increase in the distance between the first and second brake pad. In some embodiments of the invention, strut quick release tab facilitates an increase in the distance between the first and second brake pad when a user wishes to remove the tire from the bicycle. Illustrative representations of this embodiment are shown for example in FIGS. 13a, 13b and 21 (see, e.g. elements 106, 120, 162, 163, 173 and 181). In some embodiments of the invention, the cable housing is operatively coupled to the lever so that a force applied to the cable is transferred to the cable housing such that the cable housing moves and actuates the lever so that the first and the second brake arms are actuated and the first and second brake pads apply a braking force to a bicycle wheel. Illustrative representations of this embodiment are shown for example in FIG. 20 (see, e.g. elements 105, 106, 119, 120 and 177). In certain embodiments, the assembly comprises a mini-link, wherein the mini-link is operatively coupled to the stationary bridge, the lever and the strut so as to facilitate an approximately equal movement of the first brake pad and the second brake pad upon actuation of the brake assembly by the user. In one embodiment as shown in FIG. 24, the length of the mini-link is adjustable. The term "equal movement" as used for example in "equal movement of the first brake pad and the second brake pad" means that each pad moves an about equivalent distance in the opposite direction represented by the first and second brake shoe pinch action (189) in FIG. 20 toward the generic rim (183). This enables the first pad and second pad to come in contact with the rim consistently and approximately simultaneously during brake actuation. In one exemplary embodiment of an approximately equal movement, the relative distance traveled by first pad and second pad as they come in contact with the rim is different by less than 10% and/or different by less than 5%. In typical embodiments, the brake pads contact the rim in a relatively symmetrical and coordinated fashion so that a rider can detect no discernable unevenness in the braking force applied to each side of the rim. Illustrative representations of such embodiments are shown for example in FIG. 20 (see, e.g. elements 105, 106, 177 and 189).

In certain embodiments of the invention, the stationary cable anchor is disposed on a stationary element of the assembly comprising: the assembly mount; the stationary bridge; a first or second brake arm axle; or an immobile portion of the first or second arm. Illustrative representations of this embodiment are shown for example in FIG. 10 and 12 (see, e.g. elements 109, 140, 141, 135 and 136). In some embodiments, the brake assembly comprises a frame bolt adapted to secure the brake assembly to the bicycle; wherein the frame bolt exhibits an eccentric geometry that allows the brake assembly to be moved in a side-to-side direction and a up-and-down direction relative to a location on a bicycle on which the brake assembly is mounted so that an alignment of the brake assembly on the bicycle can be adjusted. Illustrative representations of this embodiment are shown for example in FIGS. 7, 8, 19a and 19b (see, e.g. element 142).

In some embodiments, the brake assembly comprises a barrel adjuster having a nut that matingly engages a surface on the lever such that the barrel adjuster can pivot relative to the lever during actuation of the brake assembly. The term "nut" is used herein according to its art accepted meaning of a type of hardware fastener with a threaded hole. Nuts are typically used opposite a mating bolt to fasten elements together. As is known in the art, nuts can be configured in a wide variety of shapes, including circles, ovals, squares, octagons, eccentric shapes and the like. As shown for example in FIGS. 3, 4 and 10 in typical embodiments of the invention having this arrangement of elements, the barrel adjuster having a nut that matingly engages a surface on the lever is used to inhibit rotation of the nut. This arrangement which inhibits rotation of the nut consequently functions to stabilize the elements within the bicycle assembly (e.g. so that the nut does not unscrew itself during the normal operation of the bicycle brake assembly). Optionally the brake assembly comprises a spring having a first end coupled to the first brake arm and a second end coupled to the second brake arm, wherein the spring is not coupled to a stationary portion of the brake assembly. In some embodiments, the brake assembly comprises an adjustable length strut and/or is designed to include adjustable pivot locations (e.g. locations comprising an architectural feature designed for this purpose such as a recess, a protrusion, a detent, a hole or the like) on the lever (see, e.g. elements 162 and 195 in FIGS. 22 and 23).

Figure 9:
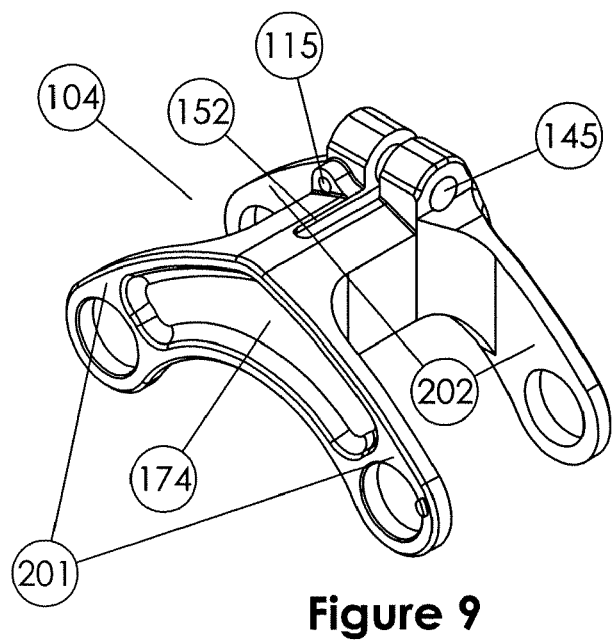
FIG. 9 shows two perspective views of bridge (104). Binder slot (152) exists so that bridge (104) can collapse onto frame bolt (142) when binder bolt (143) is tightened into binder bolt hole (145) (FIG. 7). Also shown are bridge pockets (174) for weight savings. Bridge pockets (174) also exists on the front of bridge (104) as shown in FIG. 10. Mini-link insert hole (115) is also shown.

In some embodiments of the invention, the stationary bridge has a front flange (201) and a rear flange (202) and the cable, the cable housing, the stationary bridge, the first brake arm, the second brake arm, the stationary cable anchor and the a cable housing anchor are operatively coupled to one another in an area disposed between these two flanges. Illustrative representations of this embodiment are shown for example in FIGS. 9 and 10 (see, e.g. elements 104, 105, 106, 119, 120, 132, 133, 134, 201 and 202). In certain embodiments, the brake assembly includes a sliding fit brake pad retention system comprising: a first shoe and a second shoe adapted to retain the first brake pad and the second brake pad, wherein the first and the second shoe comprise: a fixed boss element adapted to be seated in a recess of the first and second brake pads; wherein the recess is adapted to retain the first and second brake pads when they are slidingly engaged with the first and second shoe; and a relief in the first and second brake shoes that enables the brake pads to be deformably disengaged in a direction opposite of braking force from the boss as the first and second brake pads are slidingly engaged with the first and second shoe. The term "shoe" generally refers to a restraint provided when the brakes are moved to retard the movement of the brake pad (e.g. one used to connect the brake pad to the brake arm). The term "boss" generally refers to protuberance on a part designed to add strength, facilitate alignment, provide fastening, etc. Exemplary boss elements include shapes such as a tab, detent, flange etc. Illustrative representations of this embodiment are shown for example in FIGS. 14, 15a and 15b (see, e.g. elements 146, 153, 168, 177, 179 and 200). Embodiments include for example a sliding fit brake pad retention system comprising a first shoe (146) and a second shoe (146) adapted to retain the first brake pad (177) and the second brake pad (177), wherein the first and the second shoe comprise a fixed boss (168) element adapted to be seated in a recess (200) of the first and second brake pads; wherein the recess is adapted to retain the first and second brake pads when they are slidingly engaged with the first and second shoe; and a relief (179) in the first and second brake shoes that enables the brake pads to be deformably disengaged in a direction opposite of braking force from the boss as the first and second brake pads are slidingly disengaged with the first and second shoe.

Another embodiment of the invention is a sliding fit brake pad retention system for use in a bicycle brake assembly comprising: a first shoe and a second shoe adapted to retain a first brake pad and a second brake pad, wherein the first and the second shoe comprise: a fixed boss element adapted to be seated in a recess of the first and second brake pads; wherein the recess is adapted to retain the first and second brake pads when they are slidingly engaged with the first and second shoe; and a relief in the first and second brake shoes that enables the brake pads to be deformably disengaged in a direction opposite of braking force from the boss as the first and second brake pads are slidingly disengaged with the first and second shoe. From the descriptions of this embodiment that are provided herein, those of skill in the art will understand that such systems can be used with the brake assemblies disclosed herein as well as a large number of the brake assemblies known in the art (e.g. those disclosed in U.S. Pat. Nos. 7,261,188, 4,718,521, 6,125,973, 6,264,008, 6,607,05; and 7,353,918, the contents of which are incorporated by reference).

Another embodiment of the invention is a frame bolt adapted to secure a brake assembly to a bicycle; wherein the frame bolt exhibits an eccentric geometry that allows the brake assembly to be moved in a side-to-side direction and a up-and-down direction relative to a location on a bicycle on which the brake assembly is mounted so that an alignment of the brake assembly on the bicycle can be adjusted. From the descriptions of this embodiment that are provided herein, those of skill in the art will understand that such elements can be used with the brake assemblies disclosed herein as well as a large number of the brake assemblies known in the art (e.g. those disclosed in U.S. Pat. Nos. 7,261,188, 4,718,521, 6,125, 973, 6,264,008, 6,607,05; and 7,353,918, the contents of which are incorporated by reference).

Yet another embodiment of the invention is a cable actuated bicycle brake assembly comprising: an assembly mount; a cable; a cable housing; a stationary bridge; a first brake arm including a first brake pad, wherein the first brake arm is operatively coupled to the stationary bridge; a second brake arm including a second brake pad, wherein the second brake arm is operatively coupled to the stationary bridge; a linkage comprising a pivotable lever and a strut, wherein the first and second brake arms are operatively coupled to each other by the linkage; a mini-link, wherein the mini-link is operatively coupled to the stationary bridge and the linkage so as to facilitate an approximately equal movement of the first brake pad and the second brake pad upon actuation of the brake assembly by the user; wherein the cable, the cable housing, the stationary bridge, the linkage, the mini-link, the first brake arm and the second brake arm are operatively coupled such that when the brake assembly is actuated by a user applying an actuating force to the cable, the actuating force applied to the cable actuates the first and the second brake arms so that the first and second brake pads apply a braking force to a bicycle wheel. Optionally such embodiments further comprise a stationary cable anchor and/or a cable housing anchor. In certain embodiments, the brake assembly further comprises a frame bolt adapted to secure the brake assembly to the bicycle; wherein the frame bolt exhibits an eccentric geometry that allows the brake assembly to be moved in a side-to-side direction and a up-and-down direction relative to a location on a bicycle on which the brake assembly is mounted so that an alignment of the brake assembly on the bicycle can be adjusted.

Yet another embodiment of the invention is a cable actuated bicycle brake assembly comprising: an assembly mount; a cable; a cable housing; a stationary bridge; a first brake arm including a first brake pad, wherein the first brake arm is operatively coupled to the stationary bridge; a second brake arm including a second brake pad, wherein the second brake arm is operatively coupled to the stationary bridge; a frame bolt adapted to secure the brake assembly to the bicycle; wherein the frame bolt exhibits an eccentric geometry that allows the brake assembly to be moved in a side-to-side direction and a up-and-down direction relative to a location on a bicycle on which the brake assembly is mounted so that an alignment of the brake assembly on the bicycle can be adjusted; wherein: the cable, the cable housing, the stationary bridge, the first brake arm and the second brake arm are operatively coupled such that when the brake assembly is actuated by a user applying an actuating force to the cable, the actuating force applied to the cable actuates the first and the second brake arms so that the first and second brake pads apply a braking force to a bicycle wheel. Optionally the assembly further comprises a stationary cable anchor and a cable housing anchor. In certain embodiments, this assembly further comprises: a linkage comprising a pivotable lever and a strut, wherein the first and second brake arms are operatively coupled to each other by the linkage; and a mini-link, wherein the mini-link is operatively coupled to the stationary bridge, the lever and the strut so as to facilitate an approximately equal movement of the first brake pad and the second brake pad upon actuation of the brake assembly by the user.

Those of skill in the art will understand that embodiments of the invention disclosed herein include methods of using the disclosed bicycle brake assemblies to slow and/or stop a bicycle. Such methods include for example a method of applying a braking force to a bicycle wheel comprising applying an actuating force to the cable of the bicycle brake assemblies disclosed herein.

3. Reference Numerals of Representative Elements Used in Illustrative Embodiments of Invention as Shown in the Drawings 101 bicycle
102 front brake assembly
103 rear brake assembly
104 bridge
105 lever arm
106 strut arm
107 mini-link
108 lever arm axle
109 strut arm axle
110 strut tip axle
111 arm bushing
112 strut tip bushing
113 arm bushing bearing surface
114 bridge axle bearing surface
115 mini-link insert hole
116 strut tip axle bearing surface
117 strut arm axle indexing notch
118 bridge axle keying feature
119 lever
120 strut
121 lever axle
122 strut bolt
123 lever bushing
124 strut bolt bushing
125 strut bolt washer
126 lever axle bearing surface
127 lever bushing bearing surface
128 mini-link lever hole
129 strut bolt hole
130 strut bolt bushing bearing surface
131 spring
132 barrel adjuster
133 barrel adjuster nut
134 barrel adjuster bushing
135 cable plate
136 cable bolt
137 spring hole
138 lever ob-round hole
139 barrel adjuster bushing bearing surface
140 cable bearing surface
141 cable bolt hole
142 frame bolt
143 binder bolt
144 frame bolt hole
145 binder bolt hole
146 brake shoe
147 threaded insert
148 spherical washer
149 shoe washer
150 shoe bolt
151 shoe hole
152 binder slot
153 shoe undercut
154 cable housing hole
155 barrel adjuster flats
156 barrel adjuster threaded portion
157 arm pockets
158 frame bolt threaded portion
159 frame bolt flats
160 frame bolt binder portion
161 spring leg
162 threaded strut
163 threaded strut tip
164 hollow axle section
165 snap ring undercut
166 inner spherical surface
167 outer spherical surface
168 brake shoe pad boss
169 threaded insert spherical surface
170 shoe bolt hole
171 spherical washer spherical surface
172 flattened portion of spring
173 strut tip bearing surface
174 bridge pockets
175 cable housing
176 cable
177 brake pad
178 frame nut
179 shoe undercut relief
180 barrel adjust pivot axis
181 strut quick release tab
182 generic tire cross section
183 generic wheel rim cross section
184 cable housing force vector
185 lever rotation action
186 strut force vector
187 lever arm rotation action
188 strut arm rotation action
189 brake shoe pinch action
190 quick release strut action
191 quick release strut arm rotation
192 bicycle centerline
193 quick release lever arm rotation
194 frame bolt swivel tool
195 lever with adjustable leverage
196 strut arms (of 'tuning fork' strut design)
197 adjustable length mini-link
198 peal force
199 slide force
200 pad recess
201 stationary bridge front flange
202 stationary bridge rear flange

4. Specific Illustrative Embodiments of the Invention

The brake devices of the present invention have a number of representative embodiments that are illustrated in the drawings of the invention. Those of skill in the art will understand that the drawings provide non-limiting representative examples of embodiments of the invention and that numerous changes can be implemented to the construction and forms of the elements used in the embodiments of the invention shown in the drawings, all comprised within the context of the concept characterizing embodiments of this invention. From the description and associated drawings, one of skill in the art will understand that, in addition to the constellations of elements noted above, a wide variety of additional elements are typically included in various embodiments of the invention. Typically, such embodiments will include combinations of the one or more elements identified with reference numbers 102-202. Those of skill in the art will understand that these elements can be mixed and matched together in a wide variety of elements and/or combinations of elements disclosed herein (as well as those elements known in the art such as those described in U.S. Pat. Nos. 7,261,188, 4,718,521, 6,125,973, 6,264,008, 6,607,05; and 7,353,918, the contents of which are incorporated by reference) in order to generate various embodiments of this bicycle brake device.

A. Illustrative Operation of Assembly Embodiments

Brake Adjustment

Figure 2A:
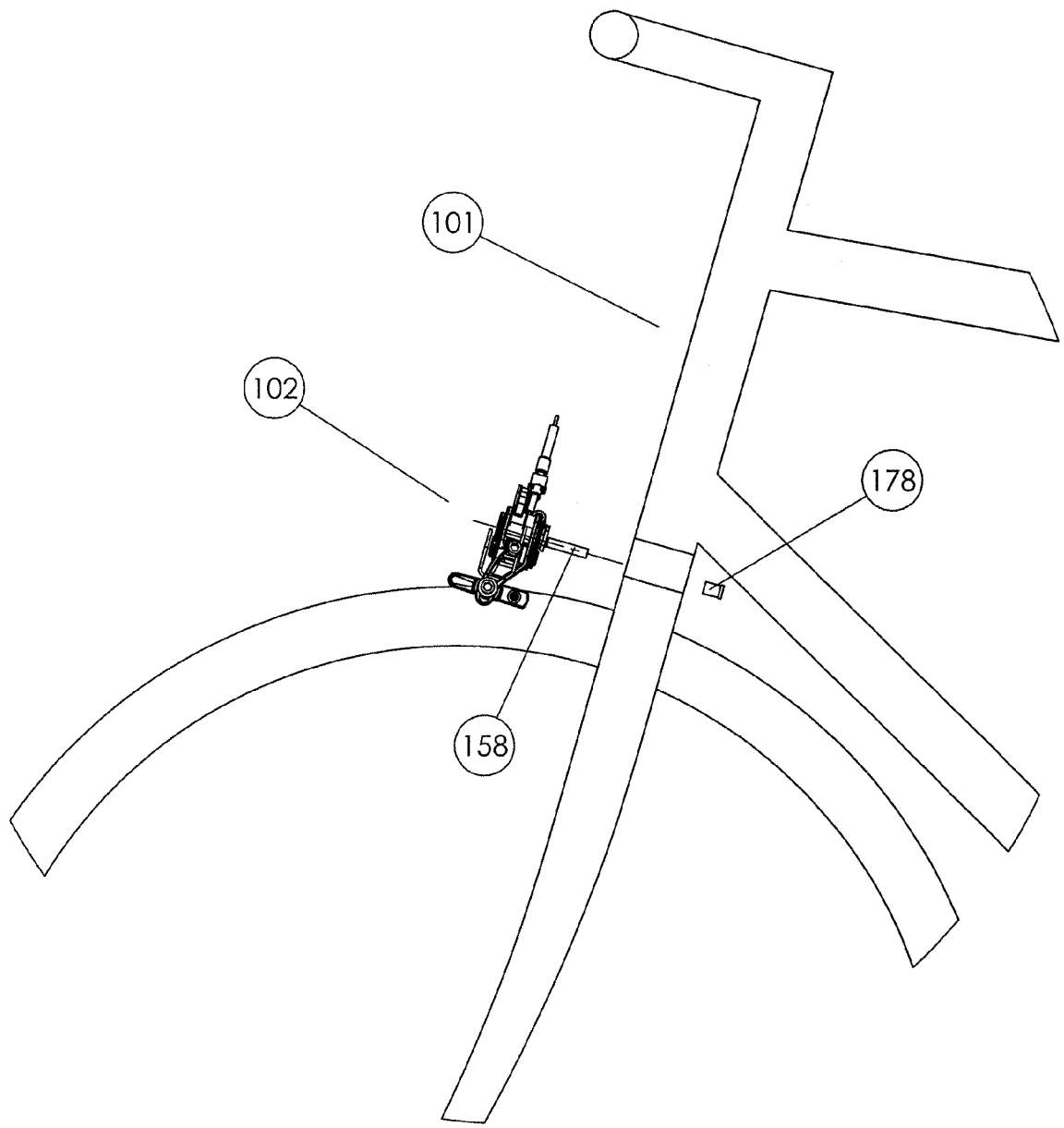
FIGS. 2a and 2b are side views of bicycle (101) showing front brake assembly (102) and rear brake assembly (103) during installation. Front brake assembly (102) and rear brake assembly (103) are held in place by frame nut (178). The only difference between front brake assembly (102) and rear brake assembly (103) is the length of frame bolt threaded portion (158). For front brake assembly (102), frame bolt threaded portion (158) is longer to mate with the front fork of the bicycle vs rear brake assembly (103) where frame bolt threaded portion (158) is shorter to mate with the brake bridge of bicycle (101).
Figure 2B:
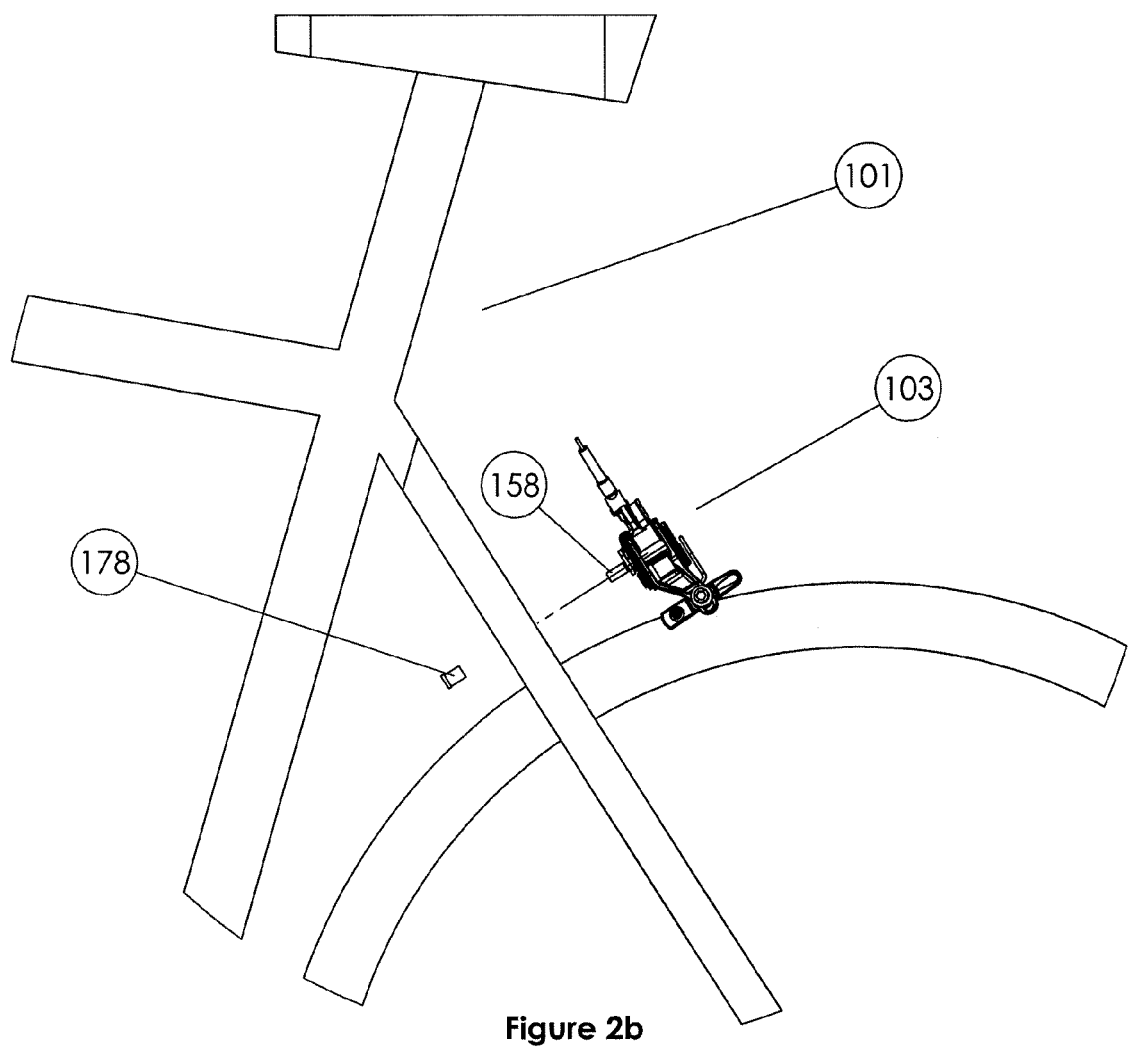
Figure 7:
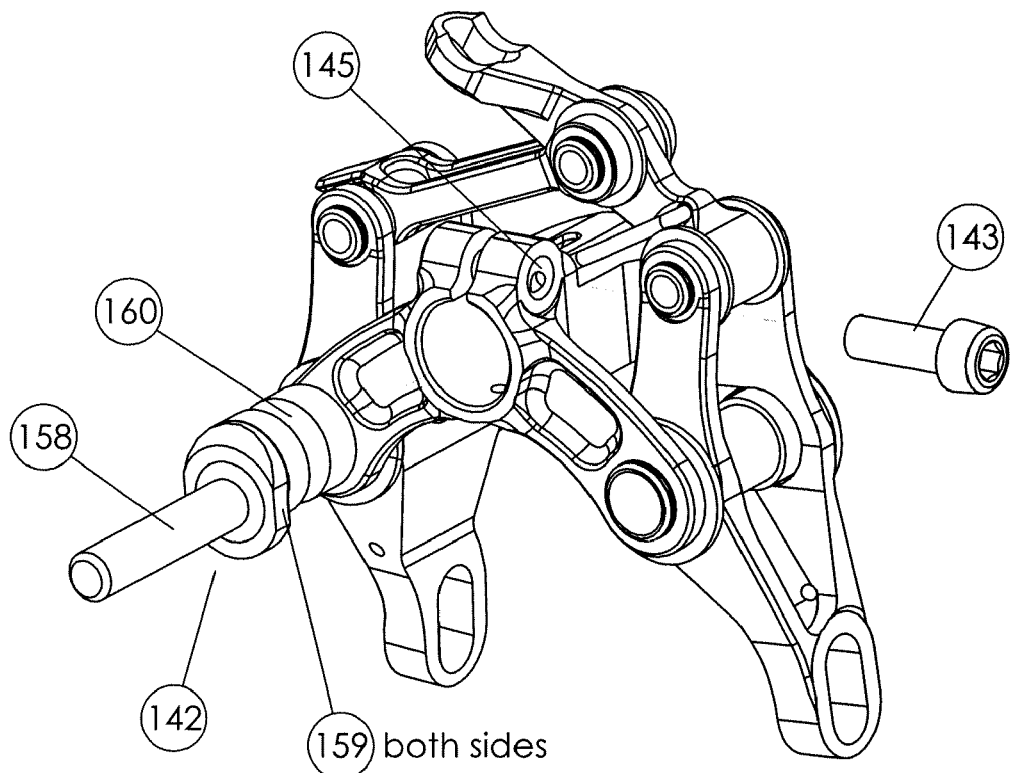
FIG. 7 is an exploded perspective view showing a further stage of brake assembly. Frame bolt (142) is inserted into frame bolt hole (144) and fixed in place by binder bolt (143). The axis of binder bolt hole (145) is located close enough to the axis of frame bolt hole (144) so that binder bolt (143) nests into an undercut in the frame bolt binder portion (160). Also shown is frame bolt flats (159) which can serve multiple purposes such as: (1) providing a member to hold the frame bolt (142) in place when fixing front brake assembly (102) or rear brake assembly (103) to bicycle (101) using frame nut (178); and (2) providing a member to rotate frame bolt (142) about frame bolt threaded portion (158) relative to bicycle (101) during brake alignment.
Figure 8:
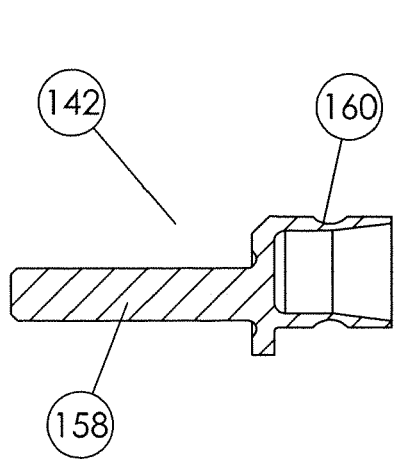
FIG. 8 shows a section view of frame bolt (142) and details frame bolt threaded portion (158) and frame bolt binder portion (160). Because the axis of the frame bolt binder portion (160) and frame bolt threaded portion (158) are not aligned, rotating frame bolt (142) using frame bolt flats (159) (FIG. 7), results in side-to-side and up-and-down brake adjustment relative to bicycle (101) so that proper alignment of front brake assembly (102) and rear brake assembly (103) to the bike wheel can be attained. An example of this alignment is also shown in FIG. 19a and 19c.
Figure 18:
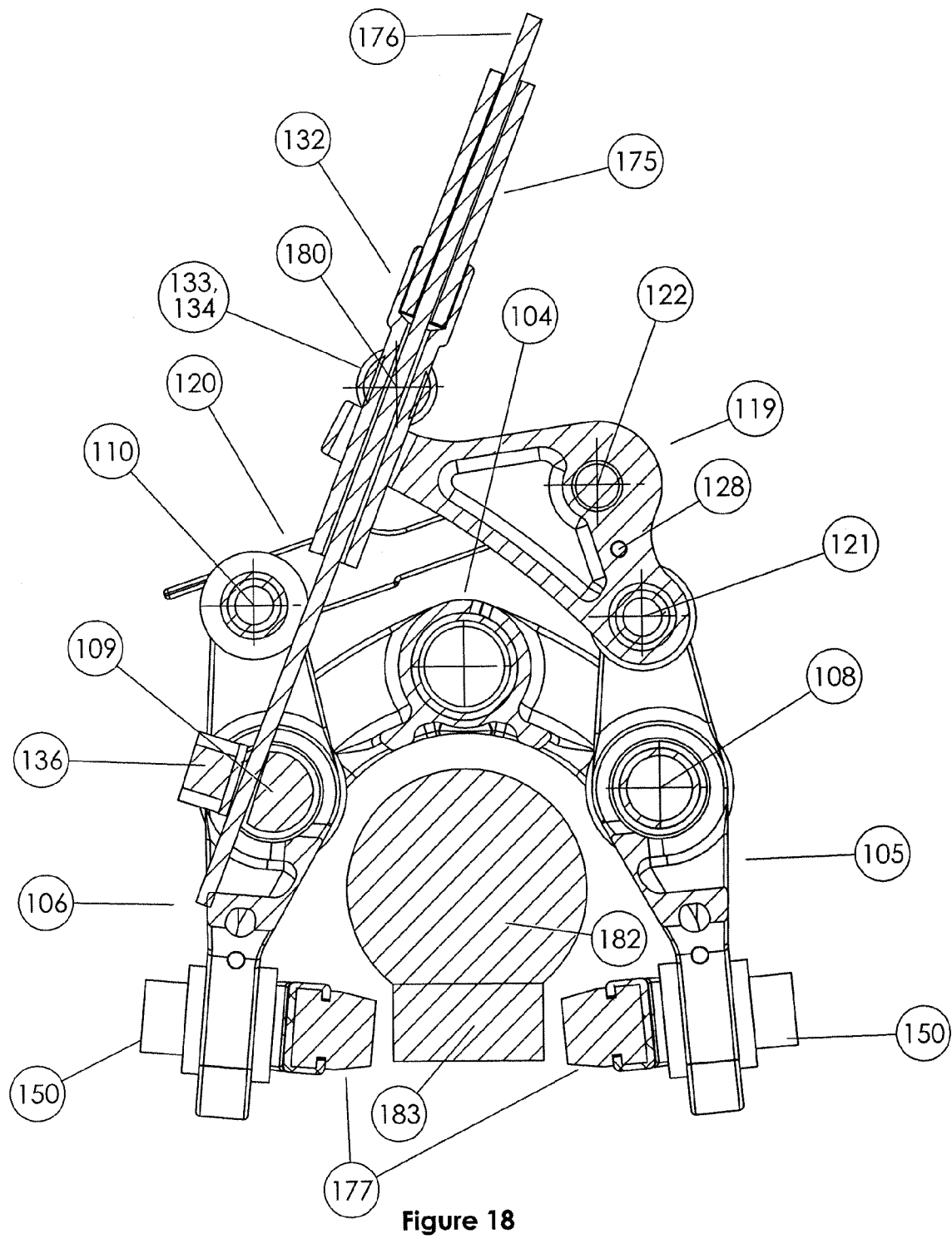
FIG. 18 is a rear section view of the assembly taken through the centerline of cable (176). Here embodiments of barrel adjust pivot axis (180), generic tire cross section (182), and generic wheel rim cross section (183) are also defined.

The brake can be assembled following typical procedures in the art as shown in FIGS. 1-14. After the brake is assembled to the bike as described in FIGS. 1-14, the brake can be adjusted for proper function and performance. Referring to FIG. 18, prior to adjustment, cable bolt (136) is loose enough so that cable (176) can slide relative to strut arm axle (109); Referring to FIG. 2a and 2b, frame nut (178) is loose enough so that front brake assembly (102) and rear brake assembly (103) can rotate relative to the bike frame using frame bolt flats (159) and frame bolt swivel tool (194); Referring to FIG. 7, binder bolt (143) is loose so that bridge (104) can rotate relative to frame bolt (142); and Referring to FIG. 14, shoe bolts (150) are loose enough in two locations to allow the brake shoes on both sides to swivel via inner spherical surface (166) and outer spherical surface (167).

Referencing FIG. 18, the gap between brake pad (177) is set so that there is a gap between brake pad (177) and generic wheel rim cross section (183) on both sides and cable bolt (136) is tightened anchoring the end of cable (176) to the brake which fixes the distance between brake pad (177) and generic wheel rim cross section (183) on both sides. Again referring to FIG. 18, the brake shoe assemblies are swiveled so that brake pad (177) are parallel and aligned with generic wheel rim cross section (183) on both sides and shoe bolt (150) are tightened down fixing the brake shoes in place.

If the brake assembly is offset relative to generic tire cross section (182) and generic wheel rim cross section (183) as shown in FIG. 19a, frame bolt (142) is rotated about frame bolt threaded portion (158) using the frame bolt swivel tool (194) that registers on frame bolt flats (159). This rotation translates the brake assembly—enabling it to be aligned with the wheel as shown in FIG. 19c. By turning the frame bolt (142) in the bike, the brake may moved vertically and horizontally allowing the brake to be positioned correctly relative to the rim. This is used for gross adjustments of the brake up-and-down so that not all of the vertical adjustment needs to be accommodated by the adjustment at the end of the brake Arms. This minimizes the adjustment needed by moving the pads up or down on the arms, thus limiting the change of brake leverage as a result pad adjustments and resulting in more consistent brake performance. This design also provides adjustment horizontally (side-to-side) which allows the brake to be easily centered over wheels that are off center relative to the bike frame or fork. In addition, this brake assembly may be adjustably rotated about the frame bolt (142) when the binder bolt (143) is loose. Once the brake is in the correct alignment, the binder bolt (143) is tightened to hold the brake to the frame bolt (142) and in alignment to the wheel. Because the binder bolt (143) axis is transverse to either eccentric axis of the frame bolt (142), the tightening of the binder bolt (143) does not tend to take the brake out of alignment and is easy to use. The large diameter of the frame bolt (142) where it attaches to the bridge also adds structural strength and rigidity further enhancing brake performance.

At this point, the brake assembly can be adjusted. If fine tuning is desire, any of the interfaces, e.g. the cable bolt (136), binder bolt (143), shoe bolt (150) and frame nut (178) can be loosened, adjusted and tightened in place. No particular chronological order is required. By loosening cable bolt (136), the gaps between brake pad (177) and generic wheel rim cross section (183) can is adjusted; by loosening shoe bolt (150), alignment of brake pad (177) relative to the bike rim can be adjusted on either side; by loosening frame nut (178) and binder bolt (143), frame bolt (142) can be rotated relative to bicycle (101) and bridge (104) providing side-to-side and up-down adjustment of the brake assembly.

Figure 23:
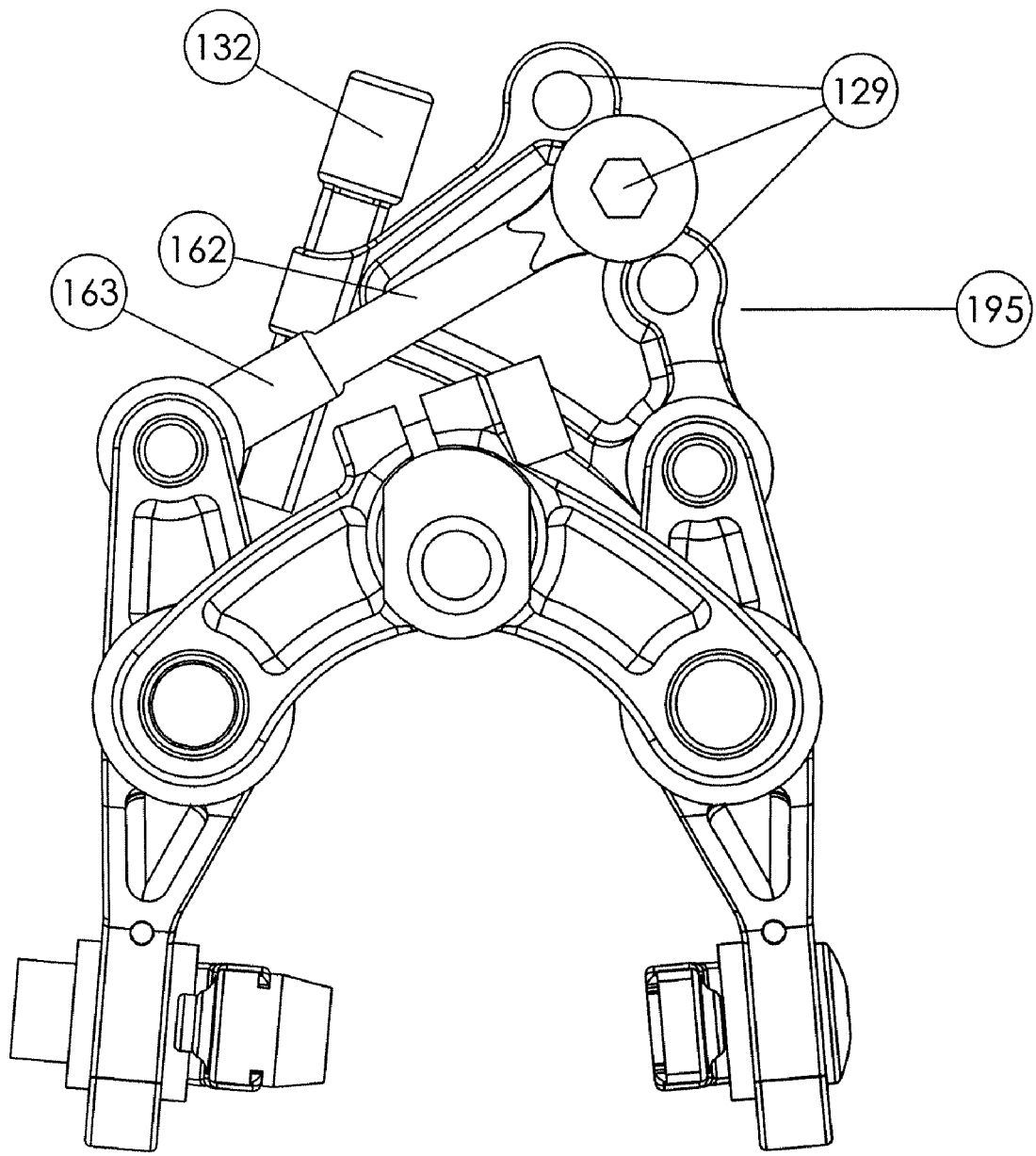
FIG. 23 is a rear view of front brake assembly (102) or rear brake assembly (103) showing lever (195) with adjustable leverage which is an alternate embodiment of the lever (119) along with threaded strut (162) and threaded strut tip (163). Here lever with adjustable leverage (195) has multiple strut bolt holes (129) to which the threaded strut (162) can be attached. The barrel adjuster (132) is also shown.

Referring to FIG. 23, additional brake adjustments are possible by using the lever with adjustable leverage (195) along with threaded strut (162) and threaded strut tip (163). Here the lever with adjustable leverage (195) can be attached at any one of multiple strut bolt holes (129). Each of these hole offers the user different leverage which results in more or less braking power.

Referring to FIG. 18, additional fine tuning is also available by rotating barrel adjuster nut (133) and barrel adjuster bushing (134) relative to barrel adjuster (132). To do so with the cylinder nut seated into a corresponding radius shape on the brake lever, the spring force that acts to keep the cable taut must be overcome which is relatively easy to do manually. Rotating the barrel adjust nut (133) increases or decreases the distance between the end of the cable housing and the cable anchor, moves the linkage and in turn, moves the brake pad (177) closer or farther from generic rim (183) resulting in brake adjustment. With the cylinder nut seated into a corresponding radius shape on the brake lever, when the cable is taut during use due to the spring force, it cannot freely rotate on the screw and take the brake out of adjustment.

Figures 13A, 13B:
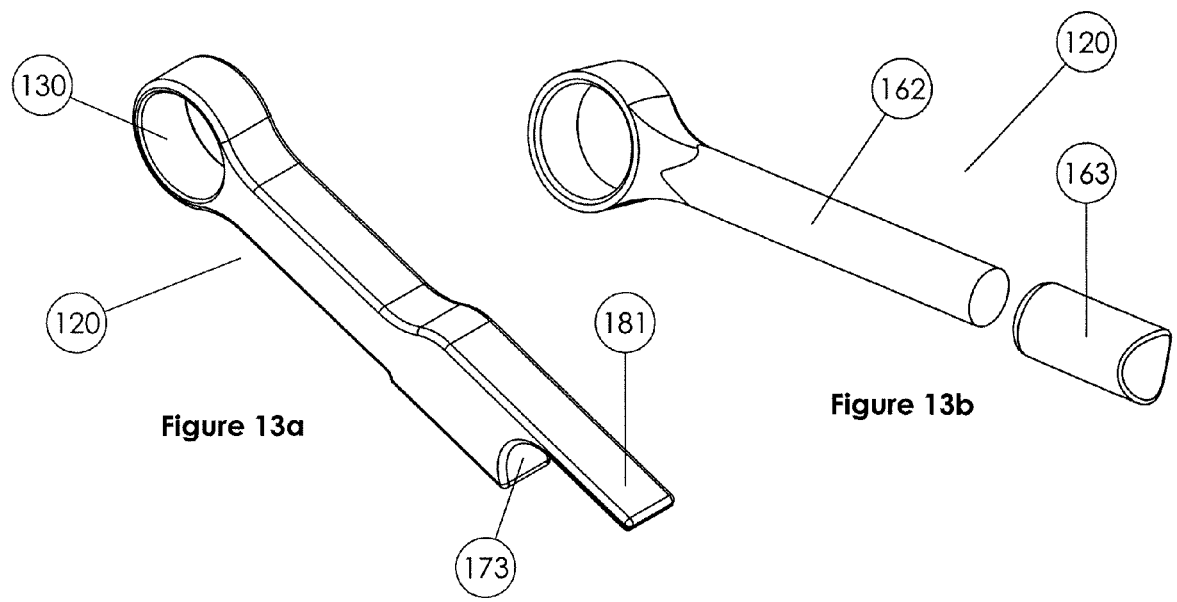
FIG. 13a shows a perspective view of strut (120), strut quick release tab (181) and strut tip bearing surface (173) are also shown for further clarity.
FIG. 13b shows a perspective view of an alternative embodiment for strut (120). Here, 120 is made up of a threaded assembly threaded strut (162) and threaded strut tip (163), enabling the length of 120 to be user adjusted.

Additional fine tuning is possible with the two piece strut (120) embodiment shown in FIG. 13b. Here, the length of the strut (120) can also be changed by rotating threaded strut (162) relative to threaded strut tip (163). Referring to FIG. 24, additional fine tuning is possible by employing an adjustable length mini-link. By adjusting the length of the mini-link (197), how far the pads are from the rim (183) is also adjusted. As one arm moves closer, the other arm moves farther away and visa versa. Therefore, but using an adjustable length mini-link (197) the rim (183) can be centered between the two pads Braking Referencing FIG. 18, the brake is activated by the user, the cable (176) is pulled back up cable housing (175), e.g. such that the cable and the cable housing move relative to each other. With cable housing (175) seated in barrel adjuster (132), cable housing (175) pushes down on barrel adjuster (132), causing barrel adjuster nut (133) and barrel adjuster bushing (134) to press down on lever barrel adjuster bushing bearing surface (139) portion of lever (119). The barrel adjuster bushing bearing surface (139) exists so that as lever (119) rotates, the cable assembly—barrel adjuster (132), barrel adjuster nut (133), barrel adjuster bushing (134), cable housing (175), and cable (176)—can rotate about barrel adjust pivot axis (180), keeping the axis of cable housing (175) properly aligned to the cable anchor point on strut arm axle (109). This minimizes binding, cable kinking and cable friction while maintaining alignment efficient cable pulling force. The cylindrical surface also acts as a 'seat' so that during use when the cable is taut, it cannot freely rotate on the screw thus taking the Brake out of adjustment. In this embodiment, the cylinder nut can only be rotated in 180° increments so that it always is 'seated' in the barrel adjuster bushing bearing surface (139) of the lever during use.

Figure 20:
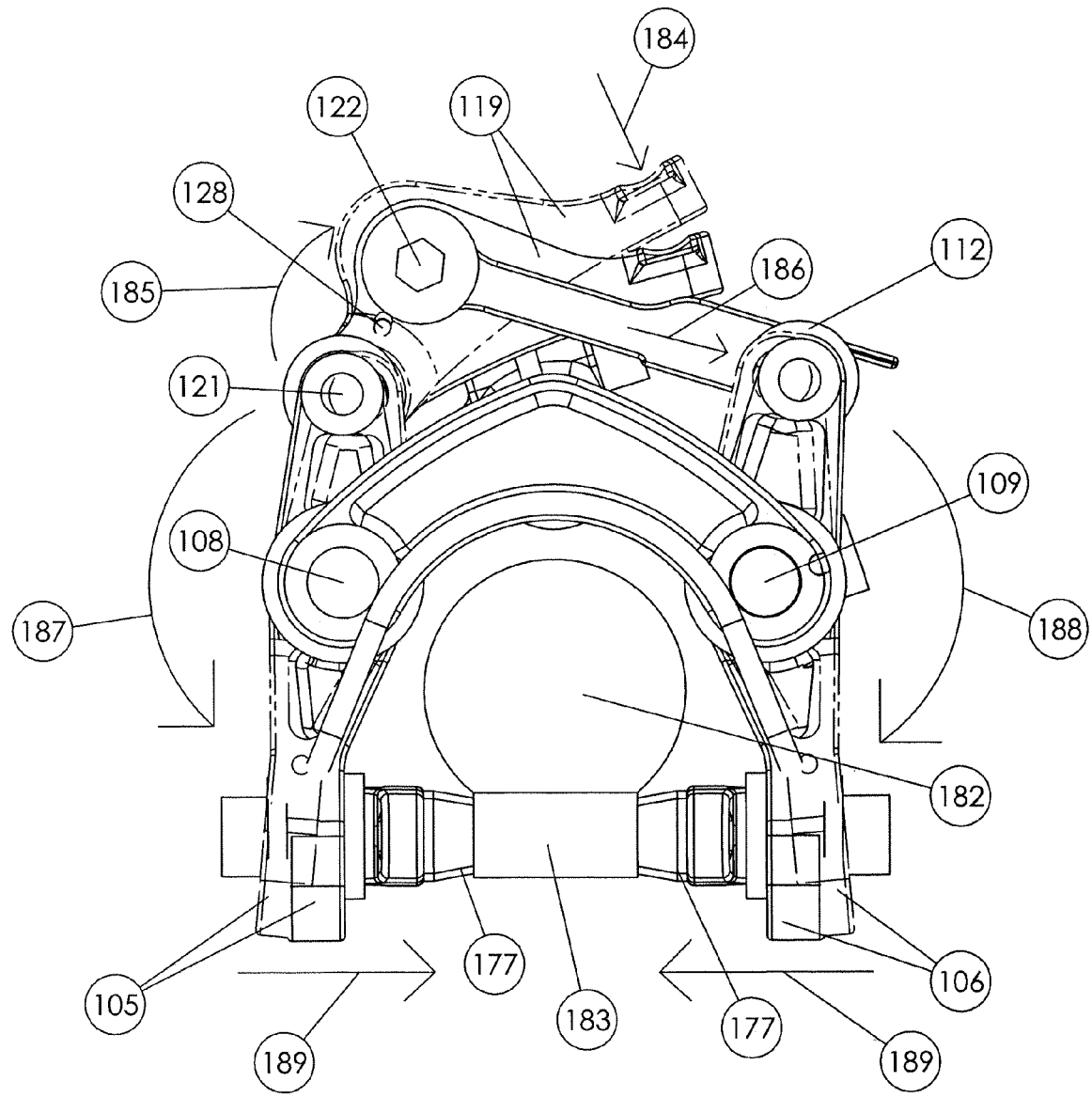
FIG. 20 is a front view of front brake assembly (102) or rear brake assembly (103) showing the brake before and after brake activation. Lever arm (105), strut arm (106) and lever (119) are shown in two positions. Phantom dotted/dashed lines are used to depict the components before activation; while solid lines depict the components after activation. Also shown are lever rotation action (185), strut force vector (186), lever arm rotation action (187), strut arm rotation action (188) and brake shoe pinch action (189) which depict the component motions during brake activation.

Referring to FIG. 20, barrel adjuster nut (133), barrel adjuster bushing (134), cable housing (175) and cable (176) are not shown for simplicity. Instead the downward force from barrel adjuster nut (133) and barrel adjuster bushing (134) on lever (119) (described above) is depicted by cable housing force vector (184). In this figure, the phantom components (as shown by dotted/dashed lines) represent the brake configuration prior to brake activation; the solid lines represent the brake components after brake activation. As lever (119) tries to rotate clockwise (CW) about lever axle (121), mini-link (107) (shown in FIG. 14) constrains the motion of lever (119) so that it rotates at about the mini-link lever hole (128) instead. This results in the two sides of the brake being activated simultaneously. In addition, this linkage results brake leverage that can be increased or decreased by moving the strut pivot location closer or further away from the lever pivot location. Further, depending on the strut's pivot location the leverage can range from relatively linear to highly non-linear relative to brake cable displacement. This is shown in the embodiment of the lever with adjustable leverage (195) in FIG. 23.

Lever Arm Activation: Referring to FIG. 20, as lever (119) rotates CW at about the mini-link lever hole (128) as indicated by lever rotation action (185), lever axle (121) rotates CCW about lever arm axle (108) causing lever arm (105) also to rotate CCW about lever arm axle (108) as indicated by lever arm rotation action (187). As this happens brake pad (177) moves inward, pressing on generic wheel rim cross section (183) to provide braking action as indicated by brake shoe pinch action (189).

Strut Arm Activation: Again referring to FIG. 20, as lever (119) rotates CW at about the mini-link lever hole (128), lever (119) also pushes on strut (120) and strut (120) pushes on strut tip bushing (112) in the direction indicated by strut force vector (186). This causes strut tip bushing (112) to rotate CW about strut arm axle (109) in the direction indicated by strut arm rotation action (188). As this happens, strut arm (106) also rotates CW about strut arm axle (109) as indicated by strut arm rotation action (188), causing brake pad (177) moves inward, pressing on generic wheel rim cross section (183) to provide braking action as indicated by brake shoe pinch action (189). An activated brake is shown in FIG. 20.

Quick Release

Figure 21:
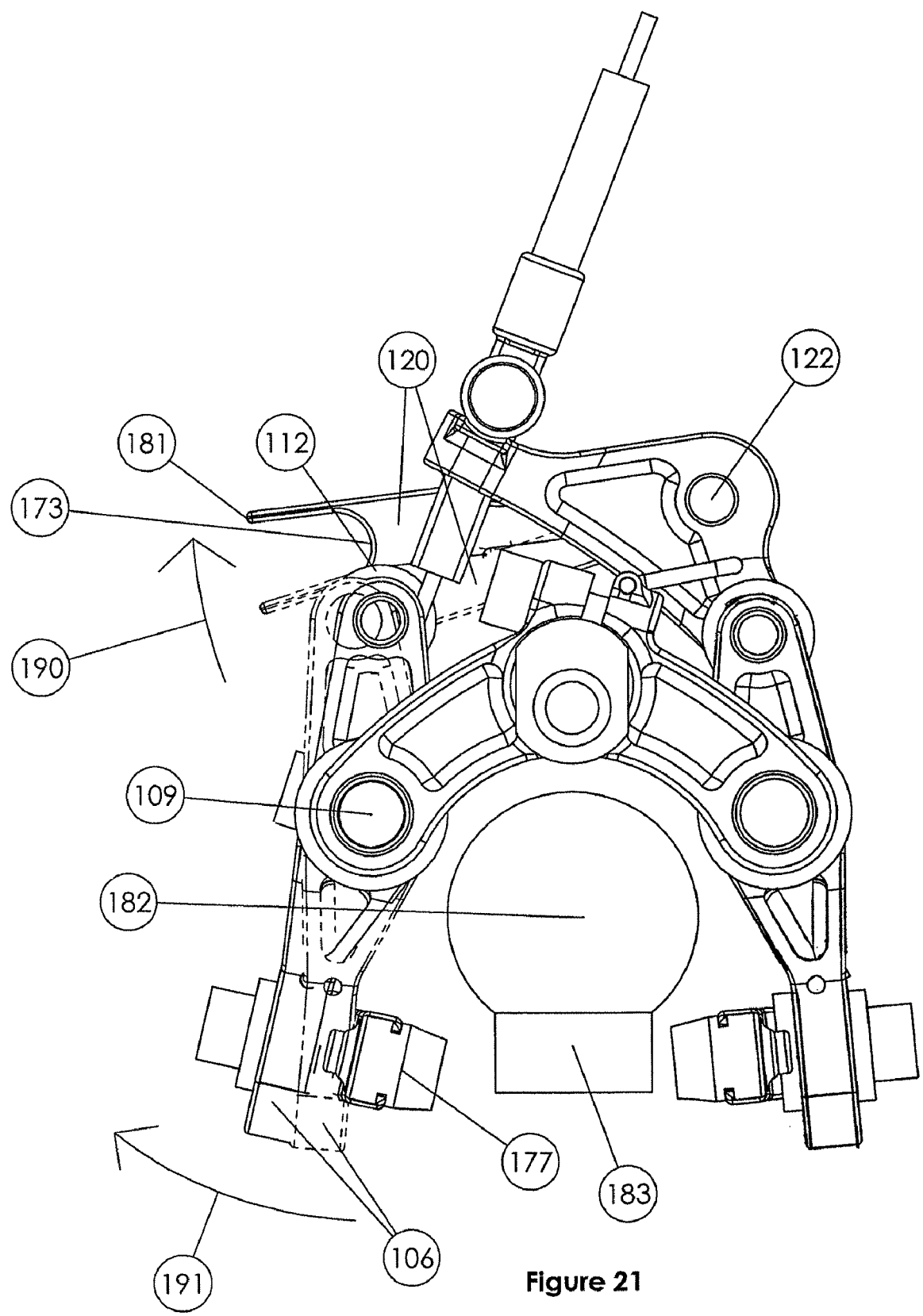
FIG. 21 is a rear view of front brake assembly (102) or rear brake assembly (103) before and after 'quick release' activation. Lever arm (105) and strut (120) are shown in two positions. Phantom depicts the components before quick release activation; solid lines depict components after activation. Also shown is strut quick release tab (181) which provides the user an easy way of rotating strut (120) during quick release activation. Also shown are quick release strut action (190) and quick release strut arm rotation (191) which depict the component motions during quick release activation.
Figure 22:
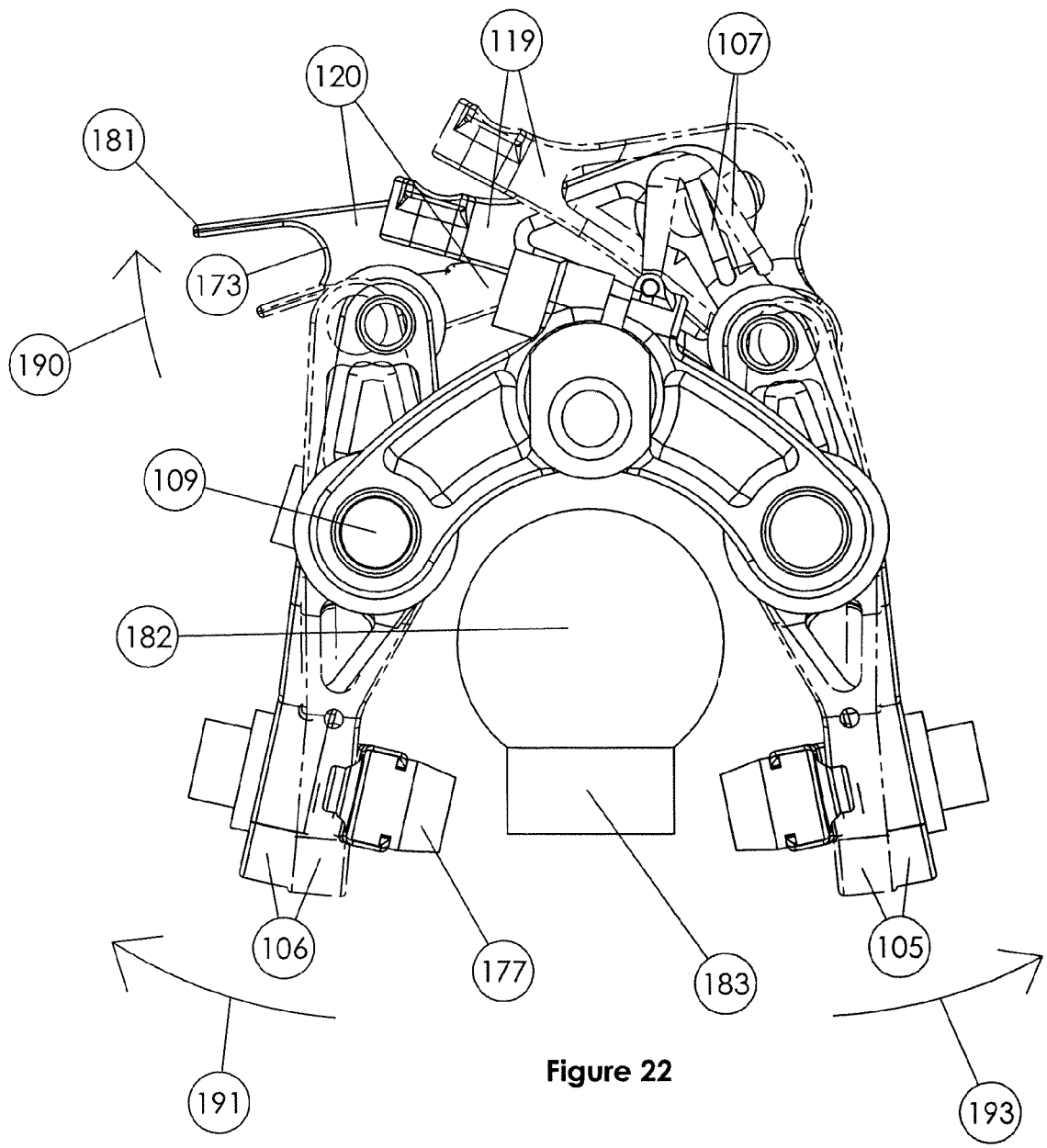
FIG. 22 is a rear view similar to FIG. 21 with an alternative embodiment of mini-link (107) shown. Here, mini-link (107) is a spring and can change length. Front brake assembly (102) or rear brake assembly (103) are shown before and after 'quick release' activation. Lever arm (105), strut arm (106), mini-link (107), lever (119) and strut (120) are shown in two positions. Phantom depicts the components before quick release activation; solid lines depict components after activation. Like in FIG. 21, quick release strut action (190) and quick release strut arm rotation (191) are shown. Also shown is quick release lever arm rotation (193) which depict the component motions during activation. Quick release lever arm rotation (193) is only possible because mini-link (107) is flexible and can change length as shown in the figure.

If the user wishes to remove one of the wheels, there is seldom enough space between brake pad (177) so that generic tire cross section (182) can pass. To create more space between brake pad (177), strut quick release tab (181) is used as shown in FIG. 21. In this figure, the phantom components represent the brake configuration prior to quick release activation; the solid represent the brake after quick release. The user can lift up on strut quick release tab (181), rotating strut (120) up about strut bolt (122) so that strut tip bearing surface (173) no longer bears on strut tip bushing (112). This allows the upper portion of strut arm (106) to move CW relative to strut arm axle (109) so that brake pad (177) is free to move away from generic tire cross section (182) and generic wheel rim cross section (183) so that the wheel can be removed. An alternative embodiment is also possible as shown in FIG. 22. Again, the phantom components represent the brake configuration prior to quick release activation; the solid represent the brake after quick release. Here mini-link (107) is flexible. After the quick release is activated with strut (120) being rotated in the direction indicated by quick release strut arm rotation (191), not only can the strut arm (106) rotate out of the way as depicted by quick release strut action (190), but lever arm (105) can also rotate out of the way as depicted by quick release lever arm rotation (193) by flexing mini-link (107).

In certain embodiments of the invention, the strut has pivots at both ends and is connected to the arm through a concave surface as shown, the strut only transmits compressive axial force. The contact is maintained with spring force keeping the strut in axial compression at all times and maintaining the location of the arm end. The quick release open feature is operated by removing the concave surface of the strut from the end of the arm allowing the arm to swing open as shown providing clearance for wheel change. This design provides a quick method which is easily operated, lightweight, simple, reliable and which provides plenty of room for wheel removal.

B. Flexible Organization of Assembly Embodiments

The brake assemblies disclosed herein are designed to provide flexible configurations in order to allow those of skill in the art to combine the various elements disclosed herein together as well as with other elements known in the art (e.g. those disclosed in U.S. Pat. Nos. 7,261,188, 4,718,521, 6,125, 973, 6,264,008, 6,607,05; and 7,353,918, the contents of which are incorporated by reference) into a variety of functional architectures depending for example upon the type of bicycle on which they are used. One typical embodiment of the invention is a bicycle brake device including a lever arm (105) and a strut arm (106) that are operatively coupled to a stationary bridge (104). This embodiment further includes a linkage comprising a lever (119) and a strut (120), wherein the linkage is operatively coupled to the lever arm (105) and the strut arm (106) and adapted to impart a force on both the lever arm (105) and the strut arm (106) when cable housing force vector (184) is applied to the lever (119) as shown in FIG. 20. In this arrangement, all of the moving elements, lever arm (105), strut arm (106), lever (119) and strut (120) occupy the space between the front and rear flanges of the bridge (104). Additionally, the cable housing force vector (184) is also applied between these two flanges. In doing so, the eccentric loading that exists in prior art due to the stacking of elements is eliminated and therefore offers an opportunity for weight savings because the structure is more efficient. Also, this arrangement of elements results in a design whose leverage can be increased by bringing the strut (120) pivot axis closer to the lever (119) pivot axis as shown by the lever with adjustable leverage (195) in FIG. 23. Unlike is the case with much of the prior art, this increase in leverage is not accompanied by an increased in arm length and therefore is inherently lighter.

As shown in FIG. 18, this embodiment includes a cable (176) anchored to a stationary element such as strut arm axle (109) and further a barrel adjuster (132) having a cylindrical bearing surface (138) as shown in FIG. 10 to mate with the cylindrical bearing surface (139) of the lever (119). With the cable (176) anchor being stationary, when the brake is activated by the user, the barrel adjuster sub-assembly is pulled down toward the cable anchor point thus applying cable housing force vector (184) to the lever (119). In the prior art, the cable anchor is attached to a moving element—either one of two movable arms or an arm that is coupled to a rigid main body extension which supports the cable housing termination point (see, e.g. the Campagnolo Delta brakeset). Further, with a stationary anchor for the cable (176), embodiments of the disclosed design have only one 'movable arm' and no rigid main body extension making this approach is inherently lighter than the prior art. With the cylindrical bearing surface (139) of the lever (119), the barrel adjuster sub-assembly can pivot/rotate to maintain cable alignment during brake activation and therefore keeping the cable from kinking or binding. Again in the pivoting barrel adjust, this embodiment offers an improvement over the prior art by improving performance without the addition of elements that add weight.

Rather than relying on even spring force or a dual pivot design as seen in the prior art, this embodiment of the invention further employs a mini-link (107) to control the travel of the lever arm (105) and the strut arm (106) upon actuation of the brake device. Because this additional element only transmits the loads needed to balance the two arms and not braking loads, this element can be very light. Therefore, this embodiment results in very repeatable, consistent brake performance with minimal increase in weight.

As shown in FIGS. 13a and 21, in this embodiment the strut (120) can include a strut tip bearing surfaces (173) and a strut quick release tab (181). This geometry results in an assembly that is both stable during brake activation but also easily disengaged—allowing the brake pads to be spread for tire removal or 'quick release'. Further, this is accomplished without the addition of elements that can add weight to the overall assembly.

The constellation of elements that make up the above-noted embodiment of the invention are typically coupled to the various additional elements such as those that are illustrated in the description and associated drawings. For example, certain embodiments of the invention further include a frame bolt (142) that is operatively coupled to a brake device and is designed so that rotation of the frame bolt (142) adjusts the brake device relative to the bicycle (101) on which it is coupled. As shown for example in FIG. 8, this frame bolt (142) has an eccentric geometry that allows for adjustment of the brake device in both side-to-side and up-and-down brake adjustment relative to the bicycle (101) so that proper alignment of the front and rear brake assemblies (102 and 103) on the bike wheel can be attained and maintained. This is an improvement over the prior art for two reasons. First, in the prior art, all of the vertical adjustment is made adjacent to the brake shoes to account for variations in frame and wheel geometries. This can result in large variations in brake leverage. In embodiments of the disclosed design, not all of the vertical adjustment needs to take place at the end of the arms adjacent to the brake shoes. Rather, the entire brake can be moved up and down by rotating the frame bolt (142) so that limited adjustment is needed at the end of the lever arm (105) and strut arm (106) and brake leverage can be more consistent regardless of frame and wheel geometries. Second, in the prior art designs, side-to-side brake adjustment is achieved by rotating the entire brake about its mounting bolt and can result in compromises to brake performance. Embodiments of the disclosed design offers a means to move the entire brake side-to-side without requiring the brake to be rotated so brake performance is not compromised.

In addition, as shown in FIG. 7, some embodiments of the invention further include a bridge binder bolt (143) that is operatively coupled to the stationary bridge (104) so that the stationary bridge can be rotated relative to the bicycle (101) to which it is coupled. Because the axis of the binder bolt (143) is transverse to the axis of rotation during adjustment, when the binder bolt (143) is tightened, this action does not have the tendency to pull the assembly out of alignment as is the case with prior art.

As also shown in FIG. 10, such embodiments of the invention can include a spring (131) designed so that it is free floating and ties only the two arms, lever arm 105 and strut arm 106. This spring can for example be attached using a spring leg (161) which engages with strut arm 106 to keep the spring in parallel with face of the bridge (104). Embodiments of the invention can include a flattened portion of the spring (172) that engages lever arm (105) so as to keep the spring from sliding out of the assembly.

FIG. 12 shows one embodiment of strut arm axle (109), one where a cable bearing surface (140) and cable bolt hole (141) function to anchor the cable (176). FIG. 13b shows an embodiment for strut (120) made up of a threaded assembly threaded strut (162) and threaded strut tip (163). This enables the length of 120 to be user adjusted.

Figure 14:
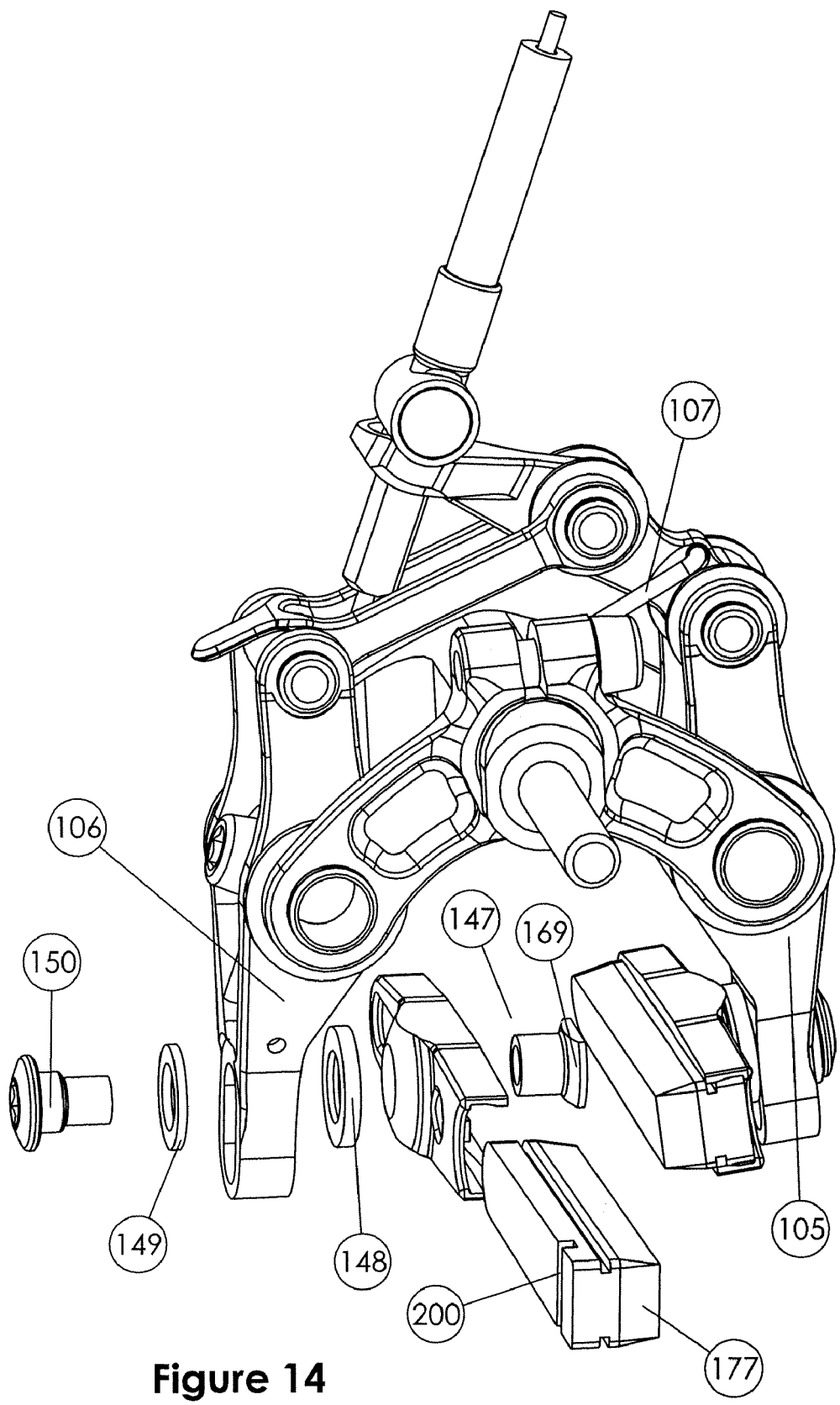
FIG. 14 is an exploded perspective view showing a further stage of assembly where two brake shoe assemblies are attached to lever arm (105) and strut arm (106). Here, threaded insert (147) is passed through brake shoe (146), spherical washer (148) and shoe hole (151). Shoe bolt (150) is passed through shoe washer (149) and threaded into shoe bolt hole (170) to fix the brake shoe assembly in place. Brake pad (177) is slid into brake shoe (146). To hold the pad in place this design has a fixed 'boss' (168) on the inside of the shoe that corresponds to a pad recess (200) in the back of the pad to retain the brake pad securely. Additionally there exists a shoe undercut relief (179) of the brake shoe 'undercut' allowing the brake pad to deform and be pulled away from the 'boss' (168) when a peal force (198) is applied. Once the pad is pulled away from the boss (168), the pad can slide above and past the 'boss' by applying a sliding force (199) for pad removal. The design uses the natural force applied during braking to push the pad firmly to the back of the shoe which keeps the boss engaged in the pad and securely retained in the shoe. Because removal loads, the peal force (198) and slide force (199) are in the opposite direction as those seen during braking, the pad remains securely in the shoe during use. This results in a design that does not required an additional screw or tools and easy to service without the difficulty of a tight friction fit.
Figure 17A:
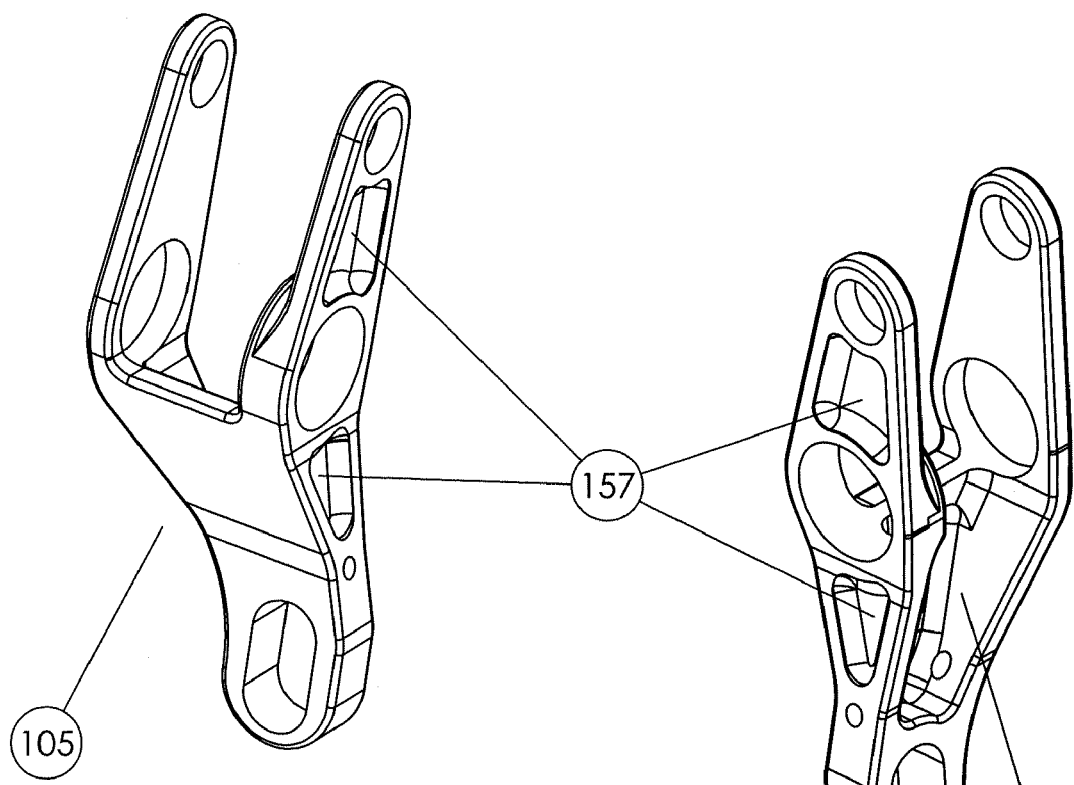
FIGS. 17a, b, c and d show perspective and section views of lever arm (105) and strut arm (106). Here, embodiments of arm pockets (157) are defined. Arm pockets (157) are for weight savings.
Figure 17B:
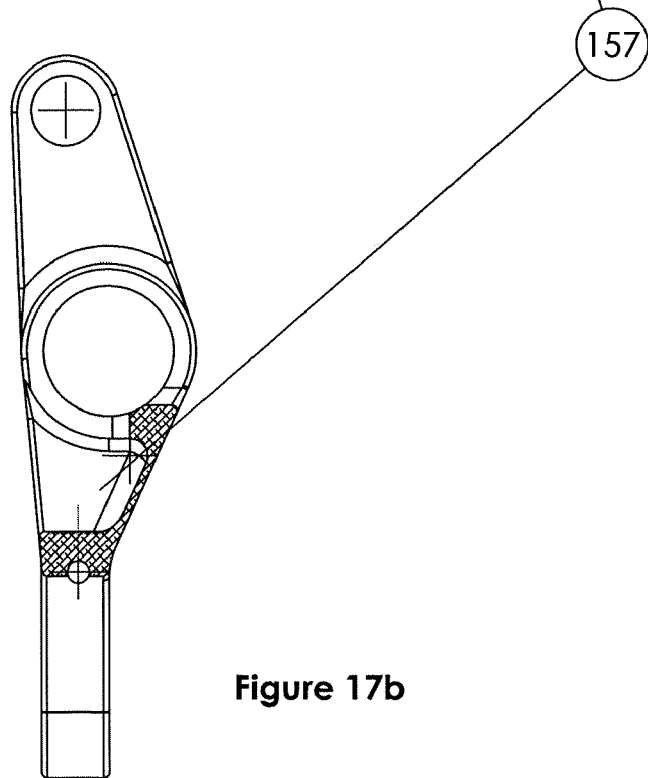
Figure 17C:
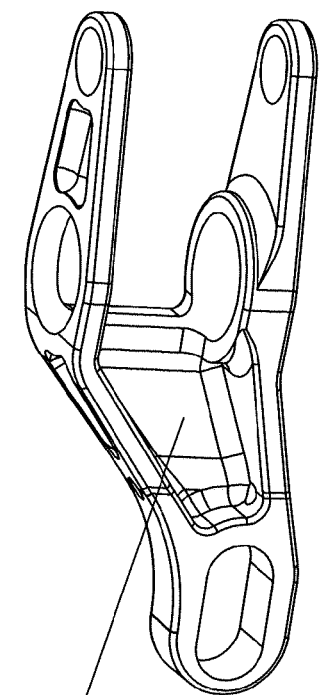
Figure 17C:
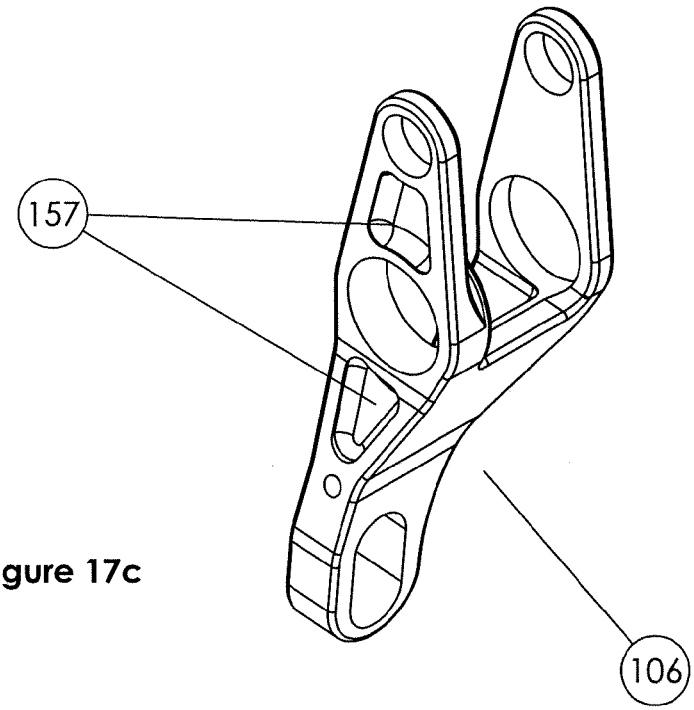
Figure 17D:
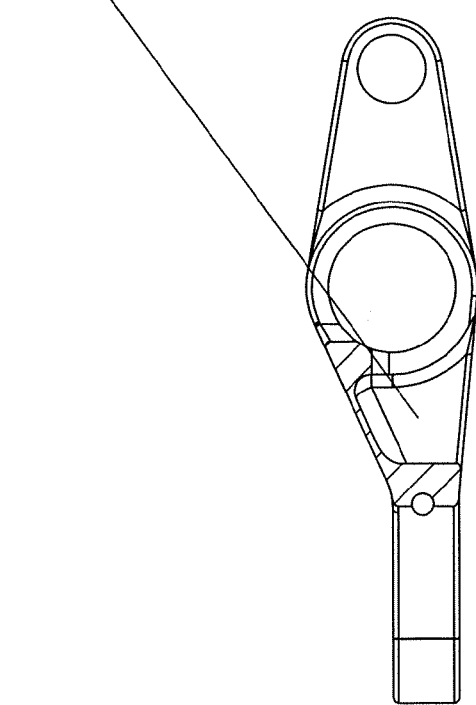

FIGS. 14 and 15 show one embodiment of a brake shoe that does not rely on either friction or an additional element to keep it's brake pad engaged as is the case with much of the prior art. Rather, this embodiment holds the pad in place by employing fixed 'boss' (168) on the inside of the shoe that corresponds to a recess (200) in the back of the pad to retain the brake pad securely. Additionally there exists a relieved section (179) of the brake shoe undercut (153) allowing the brake pad to be pulled away from the 'boss' (168) by applying a peal force (198) in the direction opposite the force seen by the pad during braking. Once the pad is pulled away from the boss (168), the pad can slide above and past the 'boss' by applying a slide force (199) for pad removal. The design uses the natural force applied during braking to push the pad firmly to the back of the shoe which keeps the boss engaged in the pad and securely retained in the shoe. Because the peal force (198) and slide force (199) are in direction opposite those seen during braking, the pad remains securely in the shoe during use. This results in a design that does not required an additional screw or tools and easy to service without the difficulty of a tight friction fit.

Throughout this application, various publications are referenced. The disclosures of these publications are hereby incorporated by reference herein in their entireties.

The present invention is not to be limited in scope by the embodiments disclosed herein, which are intended as single illustrations of individual aspects of the invention, and any that are functionally equivalent are within the scope of the invention. Various modifications to the models and methods of the invention, in addition to those described herein, will become apparent to those skilled in the art from the foregoing description and teachings, and are similarly intended to fall within the scope of the invention. Such modifications or some embodiments can be practiced without departing from the true scope and spirit of the invention.

What is claimed is:

1. A bicycle brake assembly, comprising:
 a stationary bridge having a first brake arm mounting portion, a second brake arm mounting portion, and a bridge mounting structure connected between the first and second brake arm mounting portions;
 a first brake arm having a first end portion, a second end portion, and a central portion between said end portions thereof, wherein the first brake arm is pivotably coupled at the central portion thereof to the first brake arm mounting portion;
 a second brake arm having a first end portion, a second end portion, and a central portion between said end portions thereof, wherein the second brake arm is pivotably coupled at the central portion thereof to the second brake arm mounting portion;
 displacement means coupled between the first end portion of the first brake arm and the first end portion of the second brake arm, wherein a first actuation mode of said displacement means causes said brake arms to pivot with respect to the stationary bridge such that a distance between the first end portion of said brake arms increases and wherein a second actuation mode of said displacement means causes said brake arms to pivot with respect to the stationary bridge such that a distance between the first end portion of said brake arms decreases; and a plurality of axles, wherein the first brake arm is pivotably coupled to the first brake arm mounting portion through a first one of said axles, wherein the second brake arm is pivotably coupled to the second brake arm mounting portion through a second one of said axles, wherein the first one of said axles has a cable bearing surface within an exterior surface thereof and a cable bolt hole therein adjacent to the cable bearing surface.

2. The bicycle brake assembly of 1 wherein:
the first one of said axles has an indexing structure therein;
the stationary bridge has a keying structure therein; and
the indexing structure is engaged with the keying structure for limiting rotation of the first one of said axles with respect to the stationary bridge.

3. A bicycle brake assembly, comprising:
a stationary bridge having a brake arm mounting portion, a second brake arm mounting portion, and a bridge mounting structure connected between the first and second brake arm mounting portions;
a first brake arm having a first end portion, a second end portion, and a central portion between said end portions thereof, wherein the first brake arm is pivotably coupled at the central portion thereof to the first brake arm mounting portion such that the first end portion of the first brake arm extends above the first brake arm mounting portion and the second end portion of the first brake arm extends below the first brake arm mounting portion;
a second brake arm having a first end portion, a second end portion, and a central portion between said end portions thereof, wherein the second brake arm is pivotably coupled at the central portion thereof to the second brake arm mounting portion such that the first end portion of the second brake arm extends above the second brake arm mounting portion and the second end portion of the second brake arm extends below the second brake arm mounting portion;
a linkage structure pivotably coupled between the first end portion of the first brake arm and the first end portion of the second brake arm, wherein displacement of a force application portion of the linkage structure in a first displacement direction thereof causes said brake arms to pivot with respect to the stationary bridge such that a distance between the first end portion of said brake arms increases and wherein displacement of the force application portion in a second displacement direction thereof causes said brake arms to pivot with respect to the stationary bridge such that a distance between the first end portion of said brake arms decreases; and
a plurality of axles, wherein the first brake arm is pivotably coupled to the first brake arm mounting portion through a first one of said axles, wherein the second brake arm is pivotably coupled to the second brake arm mounting portion through a second one of said axles, and wherein the first one of said axles has a cable bearing surface within an exterior surface thereof and a cable bolt hole therein adjacent to the cable bearing surface.

4. The bicycle brake assembly of 3 wherein:
the first one of said axles has an indexing structure therein;
the stationary bridge has a keying structure therein; and
the indexing structure is engaged with the keying structure for limiting rotation of the first one of said axles with respect to the stationary bridge.

5. A bicycle brake assembly, comprising:
a stationary bridge having a first pair of spaced-apart flange, a second pair of spaced-apart flanges, and a bridge mounting structure connected between the first and second pairs of spaced-apart flanges;
a first brake arm having a first end portion, a second end portion, and a central portion between said end portions thereof, wherein the first brake arm is pivotably coupled at the central portion thereof between the first pair of spaced-apart flanges such that the first end portion of the first brake arm extends above the first pair of spaced-apart flanges and the second end portion of the first brake arm extends below the first pair of spaced-apart flanges;
a second brake arm having a first end portion, a second end portion, and a central portion between said end portions thereof, wherein the second brake arm is pivotably coupled at the central portion thereof between the second pair of spaced-apart flanges such that the first end portion of the second brake arm extends above the second pair of spaced-apart flanges and the second end portion of the second brake arm extends below the second pair of spaced-apart flanges; and
a linkage structure pivotably coupled between the first end portion of the first brake arm and the first end portion of the second brake arm, wherein displacement of a force application portion of the linkage structure in a first displacement direction thereof causes said brake arms to pivot with respect to the stationary bridge such that a distance between the first end portion of said brake arms increases and wherein displacement of the force application portion in a second displacement direction thereof causes said brake arms to pivot with respect to the stationary bridge such that a distance between the first end portion of said brake arms decreases; and
a plurality of axles, wherein the first brake arm is pivotably coupled to the first pair of spaced-apart flanges through a first one of said axles, wherein the second brake arm is pivotably coupled to the second pair of spaced-apart flanges through a second one of said axles, wherein the first one of said axles has a cable bearing surface within an exterior surface thereof and a cable bolt hole therein adjacent to the cable bearing surface, and wherein the cable bearing surface and the cable bolt hole are positioned between the first pair of spaced-apart flanges.

6. The bicycle brake assembly of claim 5 wherein:
the first one of said axles has an indexing structure therein;
the stationary bridge has a keying structure therein; and
the indexing structure is engaged with the keying structure for limiting rotation of the first one of said axles with respect to the stationary bridge.

7. The bicycle brake assembly of claim 5 wherein:
the force application portion of the linkage structure is integral with a first end portion of a first linkage member of the linkage structure;
a second linkage member has a first end portion thereof pivotably coupled to the first linkage member and a second end portion thereof pivotably coupled to the first end portion of the first brake arm; and
a second end portion of the first linkage member is pivotably coupled to the first end portion of the second brake arm.

8. A bicycle brake assembly, comprising:
a stationary bridge having a first pair of spaced-apart flange, a second pair of spaced-apart flanges, and a bridge mounting structure connected between the first and second pairs of spaced-apart flanges;

a first brake arm having a first end portion, a second end portion, and a central portion between said end portions thereof, wherein the first brake arm is pivotably coupled at the central portion thereof between the first pair of spaced-apart flanges such that the first end portion of the first brake arm extends above the first pair of spaced-apart flange and the second end portion of the first brake arm extends below the first pair of spaced-apart flange;

a second brake arm having a first end portion, a second end portion, and a central portion between said end portions thereof, wherein the second brake arm is pivotably coupled at the central portion thereof between the second pair of spaced-apart flanges such that the first end portion of the second brake arm extends above the second pair of spaced-apart flanges and the second end portion of the second brake arm extends below the second pair of spaced-apart flanges;

a lever having a first end portion, a second end portion, and a central portion between said end portions thereof, wherein the lever is pivotably coupled at a first end portion thereof to the first end portion of the first brake arm; and a strut pivotably coupled at a first end portion thereof to the first end portion of the second brake arm and pivotably coupled at a second end portion thereof to the central portion of the lever.

9. The bicycle brake assembly of claim 8, further comprising:
a plurality of axles;
wherein the first brake arm is pivotably coupled to the first pair of spaced-apart flanges through a first one of said axles;
wherein the second brake arm is pivotably coupled to the second pair of spaced-apart flanges through a second one of said axles;
wherein the lever is pivotably coupled to the first brake arm through a third one of said axles; and
the strut is pivotably coupled to the second brake arm with a fourth one of said axles.

10. The bicycle brake assembly of claim 9 wherein:
the second end portion of the strut includes a strut tip bearing surface; and
the strut tip bearing surface and the fourth one of said axles are jointly configured for allowing the strut to pivot on the fourth one of said axles and allowing the strut to be selectively detached from the fourth one of said axles without requiring the fourth one of said axles to be detached from the second brake arm.

11. The bicycle brake assembly of claim 8, further comprising:
a spring having a first end thereof coupled to the first brake arm and a second end thereof coupled to the second brake arm, wherein the spring is not directly mounted on or attached to the stationary bridge.

12. The bicycle brake assembly of claim 8, further comprising:
a movement control linkage member coupled between the stationary bridge and the lever, wherein at least one of a length and a shape of the movement control linkage member and its coupling between the stationary bridge and the lever cause approximately equal movement of the first brake arm and the second brake arm for a given displacement of the second end portion of the lever.

13. A bicycle brake assembly, comprising:
a stationary bridge having a first pair of spaced-apart flange, a second pair of spaced-apart flanges, and a bridge mounting structure connected between the first and second pairs of spaced-apart flanges, wherein said flanges and the bridge mounting structure are a one-piece unit;

a first brake arm having a first end portion, a second end portion, and a central portion between said end portions thereof, wherein the first brake arm is pivotably coupled at the central portion thereof between the first pair of spaced-apart flanges;

a second brake arm having a first end portion, a second end portion, and a central portion between said end portions thereof, wherein the second brake arm is pivotably coupled at the central portion thereof between the second pair of spaced-apart flanges;

a lever having a first end portion, a second end portion, and a central portion between said end portions thereof, wherein the lever is pivotably coupled at a first end portion thereof within a lever receiving channel at the first end portion of the first brake arm; and a strut pivotably coupled at a first end portion thereof within a strut receiving channel at the first end portion of the second brake arm and pivotably coupled at a second end portion thereof to the central portion of the lever;

wherein the first brake arm, the second brake arm, the lever and the strut each pivot about a respective pivot axis; and wherein the respective pivot axis of the first brake arm, the second brake arm, the lever and the strut each extend substantially parallel to each other.

14. A bicycle, comprising:
a bicycle frame having a rear wheel brake mount;
a fork rotatably attached to the frame and having a front wheel brake mount; and
a bicycle brake assembly mounted on one of the front wheel mount and the rear wheel mount, wherein the bicycle brake assembly comprises:
a stationary bridge having a first pair of spaced-apart flange, a second pair of spaced-apart flanges, and a bridge mounting structure connected between the first and second pairs of spaced-apart flanges;
a first brake arm having a first end portion, a second end portion, and a central portion between said end portions thereof, wherein the first brake arm is pivotably coupled at the central portion thereof between the first pair of spaced-apart flanges such that the first end portion of the first brake arm extends above the first pair of spaced-apart flange and the second end portion of the first brake arm extends below the first pair of spaced-apart flange;
a second brake arm having a first end portion, a second end portion, and a central portion between said end portions thereof, wherein the second brake arm is pivotably coupled at the central portion thereof between the second pair of spaced-apart flanges such that the first end portion of the second brake arm extends above the second pair of spaced-apart flanges and the second end portion of the second brake arm extends below the second pair of spaced-apart flanges;
a lever having a first end portion, a second end portion, and a central portion between said end portions thereof, wherein the lever is pivotably coupled at a first end portion thereof to the first end portion of the first brake arm; and
a strut pivotably coupled at a first end portion thereof to the first end portion of the second brake arm and pivotably coupled at a second end portion thereof to the central portion of the lever.

* * * * *